(12) United States Patent
Uhr et al.

(10) Patent No.: US 10,846,416 B2
(45) Date of Patent: Nov. 24, 2020

(54) METHOD FOR MANAGING DOCUMENT ON BASIS OF BLOCKCHAIN BY USING UTXO-BASED PROTOCOL, AND DOCUMENT MANAGEMENT SERVER USING SAME

(71) Applicant: COINPLUG, INC., Seongnam-si (KR)

(72) Inventors: Joon Sun Uhr, Seongnam-si (KR); Jay Wu Hong, Seoul (KR); Ju Min Lee, Seongnam-si (KR)

(73) Assignee: COINPLUG, INC. (KR)

( * ) Notice: Subject to any disclaimer, the term of this patent is extended or adjusted under 35 U.S.C. 154(b) by 0 days.

(21) Appl. No.: 16/654,020

(22) Filed: Oct. 16, 2019

(65) Prior Publication Data

US 2020/0050780 A1 Feb. 13, 2020

Related U.S. Application Data

(63) Continuation of application No. PCT/KR2018/004455, filed on Apr. 17, 2018.

(30) Foreign Application Priority Data

Apr. 17, 2017 (KR) .................. 10-2017-0048993

(51) Int. Cl.
*G06F 21/62* (2013.01)
*H04L 9/06* (2006.01)
(Continued)

(52) U.S. Cl.
CPC ....... *G06F 21/6209* (2013.01); *G06Q 10/103* (2013.01); *H04L 9/0637* (2013.01);
(Continued)

(58) Field of Classification Search
None
See application file for complete search history.

(56) References Cited

U.S. PATENT DOCUMENTS 9,935,772 B1\* 4/2018 Madisetti ............. H04L 9/0819
10,114,969 B1\* 10/2018 Chaney ................ H04L 9/3247
(Continued)

FOREIGN PATENT DOCUMENTS

JP         6074074 B1    2/2017
KR  10-2002-0084642 B1  11/2002
(Continued)

OTHER PUBLICATIONS

International Search Report and Written Opinion dated Jul. 16, 2018 for PCT/KR2018/004455 filed on Apr. 17, 2018, 13 pages including English Translation of the International Search Report.

*Primary Examiner* — Saleh Najjar
*Assistant Examiner* — Michael W Chao
(74) *Attorney, Agent, or Firm* — Xsensus LLP

(57) ABSTRACT

The present invention relates to a method for managing a document on the basis of a blockchain by using an unspent transaction output (UTXO)-based protocol, and a server using the same. Specifically, the purpose of the present invention is to manage a document, and the present invention relates to: a method for preparing a document, that is, a method for issuing a document; a method for using the prepared document, that is, a method for reading the prepared document; and a method for handling the prepared document, particularly, a method for destroying the prepared document.

24 Claims, 15 Drawing Sheets

(51) Int. Cl.
*G06Q 10/10* (2012.01)
*G06F 16/21* (2019.01)

(52) U.S. Cl.
CPC ........ *G06F 16/219* (2019.01); *G06F 21/6218* (2013.01); *G06F 2221/2141* (2013.01); *G06F 2221/2151* (2013.01); *H04L 2209/38* (2013.01); *H04L 2209/60* (2013.01)

(56) References Cited

U.S. PATENT DOCUMENTS

| | | | | |
|---|---|---|---|---|
| 10,579,368 | B2* | 3/2020 | Wisnovsky | G06F 16/2365 |
| 10,650,086 | B1* | 5/2020 | Knudson | G06F 40/242 |
| 10,671,712 | B1* | 6/2020 | Lindley | H04L 63/12 |
| 10,678,866 | B1* | 6/2020 | Ranganathan | G06F 16/211 |
| 10,692,054 | B2* | 6/2020 | Chow | G06Q 50/08 |
| 2006/0200756 | A1* | 9/2006 | Politi | G06Q 10/10 715/234 |
| 2007/0260648 | A1* | 11/2007 | Friesenhahn | G06F 21/6209 |
| 2008/0109808 | A1* | 5/2008 | Wing | G06F 16/93 718/102 |
| 2012/0303968 | A1* | 11/2012 | Balinsky | H04L 9/14 713/189 |
| 2013/0262420 | A1* | 10/2013 | Edelstein | G06F 16/20 707/695 |
| 2016/0050257 | A1* | 2/2016 | Cassidy | H04L 67/06 709/213 |
| 2016/0155135 | A1* | 6/2016 | Papa | G06F 16/93 705/37 |
| 2016/0283920 | A1* | 9/2016 | Fisher | G06Q 20/02 |
| 2016/0292680 | A1* | 10/2016 | Wilson, Jr. | G06Q 20/3674 |
| 2016/0321434 | A1* | 11/2016 | McCoy | G06Q 50/184 |
| 2017/0243193 | A1* | 8/2017 | Manian | G06Q 20/3829 |
| 2018/0005186 | A1* | 1/2018 | Hunn | G06Q 30/0283 |
| 2018/0018723 | A1* | 1/2018 | Nagla | G06Q 20/4014 |
| 2018/0025442 | A1* | 1/2018 | Isaacson | G06Q 20/40 705/26.62 |
| 2018/0101848 | A1* | 4/2018 | Castagna | H04L 63/0407 |
| 2018/0158054 | A1* | 6/2018 | Ardashev | G06Q 20/389 |
| 2018/0248701 | A1* | 8/2018 | Johnson | H04L 9/3236 |
| 2018/0285839 | A1* | 10/2018 | Yang | H04L 9/3239 |
| 2018/0349572 | A1* | 12/2018 | Chen | G06F 21/10 |
| 2019/0123889 | A1* | 4/2019 | Schmidt-Karaca | H04L 9/3239 |
| 2019/0354725 | A1* | 11/2019 | Lowagie | H04L 9/3236 |
| 2020/0145487 | A1* | 5/2020 | Bathen | H04L 67/1095 |

FOREIGN PATENT DOCUMENTS

| | | |
|---|---|---|
| KR | 10-1315482 B1 | 11/2013 |
| KR | 10-1578550 B1 | 12/2015 |
| KR | 10-1680260 B1 | 11/2016 |

\* cited by examiner

Document Transaction Type I -REVOCATION

METHOD FOR MANAGING DOCUMENT ON BASIS OF BLOCKCHAIN BY USING UTXO-BASED PROTOCOL, AND DOCUMENT MANAGEMENT SERVER USING SAME

CROSS REFERENCE TO RELATED APPLICATIONS

This application is a bypass continuation of PCT/KR2018/004455, filed Apr. 17, 2018, which claims foreign priority to Korean application 10-2017-0048993 filed Apr. 17, 2017, the disclosures of each are incorporated herein by reference in their entireties.

FIELD OF THE DISCLOSURE

The present disclosure relates to a method for managing a document based on a blockchain by using a UTXO (unspent transaction output) based protocol and a server using same, and more particularly, in order to manage the document, to the method for generating, i.e., issuing, the document, the method for using, i.e., viewing, the generated document, and the method for handling the generated document, especially, for revoking the document.

That is, the present disclosure relates to the issuing method, the viewing method, and the revoking method for managing the document, and these methods correspond to the method for generating the document, the method for using the document, and the method for handling the document, and will be regarded as a group of inventions having technical inter-connectivity.

BACKGROUND OF THE DISCLOSURE

The governments around the world, as well as the government of the Republic of Korea, and related organizations put a lot of resources and effort into the processing of numerous documents. Documents handled by large organizations, such as governments, sometimes require high levels of confidentiality and security, and sometimes require accuracy, speed, and openness. Meanwhile, in line with the worldwide computerization trend, the documents are distributed in the form of electronic documents that are lighter and more favorable for reproduction and storage.

However, the electronic documents are exposed to external hacking or internal manipulation. The original document may be forged or falsified by public officials without any permission, and the person handling the document may deny the actual content of the document because of the forgery. It can also be a problem that an unauthorized person falsifies an authority and make a false document.

SUMMARY OF THE DISCLOSURE

It is an object of the present disclosure to solve all the aforementioned problems.

It is another object of the present disclosure to store information on identity authentication and electronic document issuance in a blockchain, to thereby minimize risk of an unauthorized person forging a document.

It is still another object of the present disclosure to provide a function of strong non-repudiation, by confirming that the document is generated by an authorized person and distributed without tampering once the document is issued.

It is still yet another object of the present disclosure to periodically verify an authenticity of an electronic document, to thereby guarantee that the electronic document is not forged or falsified.

It is still yet another object of the present disclosure to guarantee security and prevent forgery, by forcing every entity participating in issuing, viewing and revoking of the electronic document to use cryptographical technology like a public key-private key pair algorithm, e.g., RSA, ECC, and hash functions, etc.

In order to accomplish objects above, representative structures of the present disclosure are described as follows.

In accordance with one aspect of the present disclosure, there is provided a method for issuing a document based on a blockchain, including steps of: (a) a document-managing server, if a document-issuing request from a document issuance requester is acquired, instructing a document-issuing server of a document-issuing institution which has an issuance permission of the document to acquire identification information on the document wherein a management permission of the document is given to the document-issuing institution, and instructing a document-storing device to acquire location information representing where the document is generated or stored by referring to the identification information on the document, to thereby acquire information on an original document including the document itself or its processed one which is generated or stored as corresponding to the location information; and (b) (i) the document-managing server generating contents of a document-transmitting transaction representing a transfer of the management permission of the document from the document-issuing institution as a transmitter of the document to the document issuance requester as a recipient of the document, and transmitting the document-transmitting transaction to a blockchain database, to thereby instruct the blockchain database to store a document-transmitting transaction function value, created by applying a specific operation to the document-transmitting transaction, in the blockchain database itself, and (ii) the document-managing server displaying or supporting another device connected with the document-managing server to display access information, to be used for accessing an issuance result of the document and the information on the original document, to the document issuance requester.

As one example, the step of (b) further includes a process of: (iii) the document-managing server transmitting the information on the original document to the blockchain database or another database connected with the document-managing server, to thereby allow the blockchain database or said another database to retain the information on the original document.

As one example, at the process of (ii) in the step of (b), the access information is retrieved from the blockchain database. 4. The method of claim 1, wherein the document-transmitting transaction includes header information, a transaction input, a transaction output, and at least one redeeming condition-determining code configured to determine at least one redeeming condition.

As one example, the header information includes transaction version information, transaction type information, and a time-stamp corresponding to a time of occurrence of the document-transmitting transaction.

As one example, the transaction input includes at least one of (i) information on personnel with a document-viewing permission representing who has the document-viewing permission of the document, (ii) a previous document-transmitting transaction function value created by applying the specific operation to each previous document-transmitting transaction which is referred to by the document-transmitting transaction, (iii) an output index of said each previous document-transmitting transaction, and (iv) at least one signature value of at least one document transmitter who transmitted the document.

As one example, the transaction input further includes document information, and wherein the document information includes an issuance time and date of the document, a type of the document, a title of the document, a document-information function value created by applying the specific operation to the information on the original document, information on the document issuance requester who requested the document, a unique identifier of the document, information on the document-issuing institution, information on a document-issuing person in charge of issuing the document, information on authenticity of the document, and the access information on the document.

As one example, the information on the document issuance requester includes a name of the document issuance requester and an identifier of the document issuance requester, and wherein the identifier of the document issuance requester is a universally unique identifier (UUID).

As one example, the transaction input further includes at least one piece of additional document information, and wherein the additional document information includes (i) a transaction ID representing information on a location of the document-transmitting transaction function value, created by applying the specific operation to the document-transmitting transaction, in the blockchain database, (ii) a content section, and (iii) a signature section.

As one example, the content section includes a public key of an author of the additional document information, a time-stamp corresponding to a time of creation of the additional document information, and a comment added by the author of the additional document information, and wherein the signature section includes a signature value created by signing the content section with a private key of the author of the additional document information.

As one example, the previous document-transmitting transaction function value included in the document-transmitting transaction corresponding to an issuance of the document is a null function value, and wherein the signature value of said at least one document transmitter is a signature value of the document-issuing institution, and wherein the signature value of said at least one document transmitter is included in the document-transmitting transaction.

As one example, the redeeming condition-determining code is a smart contract, wherein the smart contract is (i) a source code which is compiled into bytecodes capable of an execution on at least one computing device, (ii) configured to perform management of the document according to whether the redeeming condition is satisfied, at a time of the execution, and wherein an integrity resulting from the execution is verified by a consensus outputted from the computing device.

As one example, the redeeming condition is at least one of one or more document-transmitting and document-viewing conditions, one or more document restriction conditions, and a document fee-charging condition.

As one example, the document-transmitting and document-viewing conditions include at least one of (i) a condition for allowing the document to be viewed by at least one person, (ii) a condition for allowing transmission of the document to a third party, (iii) a condition for requiring a document-viewing person to log a fact that the document-viewing person viewed the document, (iv) a condition for requiring the document-viewing person to log a fact that the document-viewing person confirmed a content of the document, (v) a condition for restricting the document to be viewed by at least one predetermined specific entity only, (vi) a condition for restricting the document to be viewed by one or more entities belonging to a predetermined specific party only, (vii) a condition for preventing at least one predetermined certain entity from viewing the document, (viii) a condition for restricting the document to be viewed only if at least one predetermined particular entity allowed the document to be viewed, and (ix) a condition for restricting the number of the transmission of the document to be less than a predetermined number.

As one example, the document restriction conditions include at least one of (i) a condition for preventing the information on the original document from being printed, and (ii) a condition for allowing transmission of the information on the original document via e-mails.

As one example, the document fee-charging condition is for charging a fee on at least one of an issuance, a view, and a revocation of the document.

As one example, the transaction output includes an address of at least one document recipient, a name of the document recipient, and an identifier of the document recipient.

In accordance with another aspect of the present disclosure, there is provided a method for viewing a document based on a blockchain, including steps of: (a) a document-managing server, on condition that information on an original document including the document itself or its processed one of the document has been issued in response to a document-issuing request from a document issuance requester, and a document-transmitting transaction function value created by applying a specific operation to one or more document-transmitting transactions has been stored in a blockchain database wherein the document-transmitting transactions have either (i) a document-issuing institution as a transmitter of the document and the document issuance requester as a last recipient of the document thus far, or (ii) a first specific recipient as the transmitter of the document and a second specific recipient as the last recipient of the document thus far, if a document-viewing request including access information for accessing the document is acquired from a document-viewing requester, determining whether a document-viewing permission for the document is granted to the document-viewing requester; and (b) the document-managing server, if the document-viewing permission is determined as granted to the document-viewing requester, (i) transmitting the access information for accessing the document to the blockchain database or another database, to thereby instruct the blockchain database or said another database to provide the information on the original document, corresponding to the access information, to the document-managing server or to another device connected with the document-managing server, and if the information on the original document is acquired, displaying or supporting another device to display the information on the original document to the document-viewing requester.

As one example, whether the document-viewing permission is granted to the document-viewing requester is determined by referring to at least one of (i) a document-transmitting and document-viewing condition of a redeeming condition-determining code included in a last document-transmitting transaction among the document-transmitting transactions, and (ii) information on personnel with the document-viewing permission in a transaction input included in the last document-transmitting transaction.

As one example, if a document-viewing request, including the access information, for the document is acquired from the document-viewing requester who is different from the last recipient of the document thus far at the step of (a), then the step of (b) further includes a process of (ii) generating a content of an additional document-transmitting transaction which is a document-transmitting transaction that transfers a management permission of the document with the last recipient of the document thus far as the transmitter of the document and with the document-viewing requester as the recipient of the document, and transmitting the access information and the additional document-transmitting transaction to the blockchain database, to thereby allow the blockchain database to provide the information on the original document, corresponding to the access information, to the document-managing server, and to store the additional document-transmitting transaction in the blockchain database itself.

As one example, the transaction input of the additional document-transmitting transaction includes a value created by applying the specific operation to a last document-transmitting transaction as a previous document-transmitting transaction function value.

As one example, at the process of (ii) in the step of (b), if an additional input from the document-viewing requester is acquired, the document-managing server incorporates additional document information into the additional document-transmitting transaction, such that a content section of the additional document information includes the additional input.

In accordance with still another aspect of the present disclosure, there is provided a method for revoking a document which is managed using a blockchain, including steps of: (a) a document-managing server, on condition that information on an original document including the document itself or its processed one of the document has been issued in response to a document-issuing request from a document issuance requester, and a document-transmitting transaction function value created by applying a specific operation to one or more document-transmitting transactions has been stored in a blockchain database wherein the document-transmitting transactions have either (i) a document-issuing institution as a transmitter of the document and the document issuance requester as a last recipient of the document thus far, or (ii) a first specific recipient as the transmitter of the document and a second specific recipient as the last recipient of the document thus far, if a document-revoking request including access information for accessing the document is acquired from a document revocation requester, determining whether a document-revoking permission for the document is granted to the document revocation requester; and (b) the document-managing server, if the revocation permission is determined as granted to the document revocation requester, transmitting a document-revoking transaction which is a document-transmitting transaction for transferring a management permission of the document to the blockchain database with the last recipient of the document thus far as the transmitter of the document and with an address for revocation as an address of the recipient of the document, to thereby allow the blockchain database to store a document-revocation function value created by applying the specific operation to the document-revoking transaction in the blockchain.

As one example, a private key corresponding to the address for revocation is stored by a managing entity.

In accordance with still yet another aspect of the present disclosure, there is provided a document-managing server for issuing a document based on a blockchain, including: a communication part for acquiring a document-issuing request from a document issuance requester; and a processor configured to execute instructions to perform or support another device to perform processes of: (I) instructing a document-issuing server of a document-issuing institution which has an issuance permission of the document to acquire identification information on the document wherein a management permission of the document is given to the document-issuing institution, and instructing a document-storing device to acquire location information representing where the document is generated or stored by referring to the identification information on the document, to thereby acquire information on an original document including the document itself or its processed one which is generated or stored as corresponding to the location information and (II) (i) generating contents of a document-transmitting transaction representing a transfer of the management permission of the document from the document-issuing institution as a transmitter of the document to the document issuance requester as a recipient of the document, and transmitting the document-transmitting transaction to a blockchain database, to thereby instruct the blockchain database to store a document-transmitting transaction function value, created by applying a specific operation to the document-transmitting transaction, in the blockchain database itself, and (ii) displaying or supporting another device connected with the document-managing server to display access information, to be used for accessing an issuance result of the document and the information on the original document, to the document issuance requester.

As one example, the process of (II) further includes a process of: (iii) transmitting the information on the original document to the blockchain database or another database connected with the document-managing server, to thereby allow the blockchain database or said another database to retain the information on the original document.

As one example, at the process of (ii), the access information is retrieved from the blockchain database.

In accordance with still yet another aspect of the present disclosure, there is provided a document-managing server for viewing a document based on a blockchain, including: a communication part for, on condition that information on an original document including the document itself or its processed one of the document has been issued in response to a document-issuing request from a document issuance requester, and a document-transmitting transaction function value created by applying a specific operation to one or more document-transmitting transactions has been stored in a blockchain database wherein the document-transmitting transactions have either (i) a document-issuing institution as a transmitter of the document and the document issuance requester as a last recipient of the document thus far, or (ii) a first specific recipient as the transmitter of the document and a second specific recipient as the last recipient of the document thus far, acquiring a document-viewing request including access information for accessing the document from a document-viewing requester; and a processor for determining whether a document-viewing permission for the document is granted to the document document-viewing requester; wherein, if the document-viewing permission is determined as granted to the document document-viewing requester, the processor performs processes of (i) transmitting the access information for accessing the document to the blockchain database or another database, to thereby instruct the blockchain database or said another database to provide the information on the original document, corresponding to the access information, to the document-managing server or to another device connected with the document-managing server, and if the information on the original document is acquired, displaying or supporting another device to display the information on the original document to the document-viewing requester.

As one example, if a document-viewing request, including the access information, for the document is acquired from the document-viewing requester who is different from the last recipient of the document thus far, then the process further performs a process of (ii) generating a content of an additional document-transmitting transaction which is a document-transmitting transaction that transfers a management permission of the document with the last recipient of the document thus far as the transmitter of the document and with the document-viewing requester as the recipient of the document, and transmitting the access information and the additional document-transmitting transaction to the blockchain database, to thereby allow the blockchain database to provide the information on the original document, corresponding to the access information, to the document-managing server, and to store the additional document-transmitting transaction in the blockchain database itself.

As one example, at the process of (ii), if an additional input from the document-viewing requester is acquired, the processor incorporates additional document information into the additional document-transmitting transaction, such that a content section of the additional document information includes the additional input.

In accordance with still yet another aspect of the present disclosure, there is provided a document-managing server for revoking a document which is managed using a blockchain, including: a communication part for, on condition that information on an original document including the document itself or its processed one of the document has been issued in response to a document-issuing request from a document issuance requester, and a document-transmitting transaction function value created by applying a specific operation to one or more document-transmitting transactions has been stored in a blockchain database wherein the document-transmitting transactions have either (i) a document-issuing institution as a transmitter of the document and the document issuance requester as a last recipient of the document thus far, or (ii) a first specific recipient as the transmitter of the document and a second specific recipient as the last recipient of the document thus far, acquiring a document-revoking request including access information for accessing the document from a document revocation requester; and a processor for determining whether a document-revoking permission for the document is granted to the document revocation requester; wherein, if the revocation permission is determined as granted to the document revocation requester, the processor performs a process of transmitting a document-revoking transaction which is a document-transmitting transaction for transferring a management permission of the document to the blockchain database with the last recipient of the document thus far as the transmitter of the document and with an address for revocation as an address of the recipient of the document, to thereby allow the blockchain database to store a document-revocation function value created by applying the specific operation to the document-revoking transaction in the blockchain.

Further, in accordance with still yet another example embodiments of the present disclosure, a document-managing server for performing methods mentioned above is provided.

BRIEF DESCRIPTION OF THE DRAWINGS

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
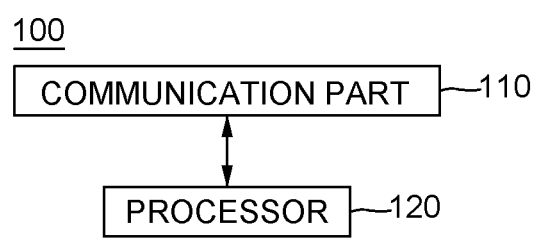
FIG. 1 is a conceptual diagram illustrating a document-managing server for performing a method for managing a document in accordance with a first example embodiment and a second example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the present disclosure.

Throughout the present specification, a "database" may be systematic data, i.e., integral sets of managed information and its management system, and may include a general relational database, MongoDB, and a blockchain database, but the scope of the present disclosure is not limited thereto. The present specification describes a blockchain database of a virtual currency for convenience of explanation, but those skilled in the art understand that the scope of the present disclosure is not limited thereto.

Throughout the present specification, a "public blockchain" may be a blockchain used publicly, and may be accessible by a document-managing server in accordance with the present disclosure.

The blockchain may be used for the virtual currency, and the virtual currency may be digital currency distributed by transactions based on digital wallets of blockchain technology, such as Bitcoin, Litecoin, Darkcoin, Namecoin, Dogecoin, Ripple, etc.

Further, in this specification, a "private blockchain" indicates an independently configured private blockchain, that is, the blockchain managed directly by the servers in accordance with the present disclosure, not the public blockchain.

Also, throughout the present specification, a "blockchain" may represent a public blockchain and a private blockchain.

Besides, in the detailed description and claims of the present disclosure, a term "include" and its variations are not intended to exclude other technical features, additions, components or steps. Other objects, benefits and features of the present disclosure will be revealed to those skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

In a first example embodiment of the present disclosure, a document is issued, a user is allowed to transmit and view the document, and the document is allowed to be revoked as need be, and transactions regarding issuance, transmission, view, and revocation as such are recorded in a first blockchain, for document management based on the blockchain in accordance with the present disclosure.

In a second example embodiment of the present disclosure, the transactions regarding the issuance, the transmission, the view, and the revocation are stored in the first blockchain, and a representative function value, e.g., a representative hash value generated from the transactions stored in the first blockchain, is stored in a second blockchain. That is, the second example embodiment is configured in a type of an anchoring method which improves an integrity of stored information in double.

For reference, in accordance with the present disclosure, the first blockchain may be a database where data is stored directly, and the second blockchain may be a database where the data is stored indirectly via the first blockchain for ensuring the integrity of the data.

As used in this specification and the appended claims, the singular forms "a," "an," and "the" include plural referents unless the content and context clearly dictates otherwise. These embodiments will be described in sufficient detail by referring to attached drawings regarding the embodiments of the present disclosure to allow those skilled in the art to practice the disclosure.

FIG. 1 is a drawing schematically illustrating a document-managing server for providing a document management service in accordance with one example embodiment of the present disclosure.

By referring to FIG. 1, the document-managing server in accordance with the present disclosure, may be a computing device 100 including a communication part 110 and a processor 120 and may communicate directly or indirectly with other computing devices. The document-managing server may be comprised of multiple computing devices, and a document-issuing server and the blockchain database may also be comprised of multiple computing devices.

Specifically, servers such as the document-managing server, the document-issuing server, the blockchain database, etc. and a user device provided for the document management in accordance with the present disclosure may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The communication part 110 of such computing devices may transmit requests and receive responses with other connected devices. As one example, such requests and responses may be carried out by the same TCP session, but they are not limited to these. For example, they could be transmitted and received as UDP datagrams.

Also, the processor 120 of such devices may include hardware configuration of MPU (Micro Processing Unit) or CPU (Central Processing Unit), cache memory, data bus, etc. Additionally, any OS and software configuration of applications that achieve specific purposes may be further included.

Figure 2:
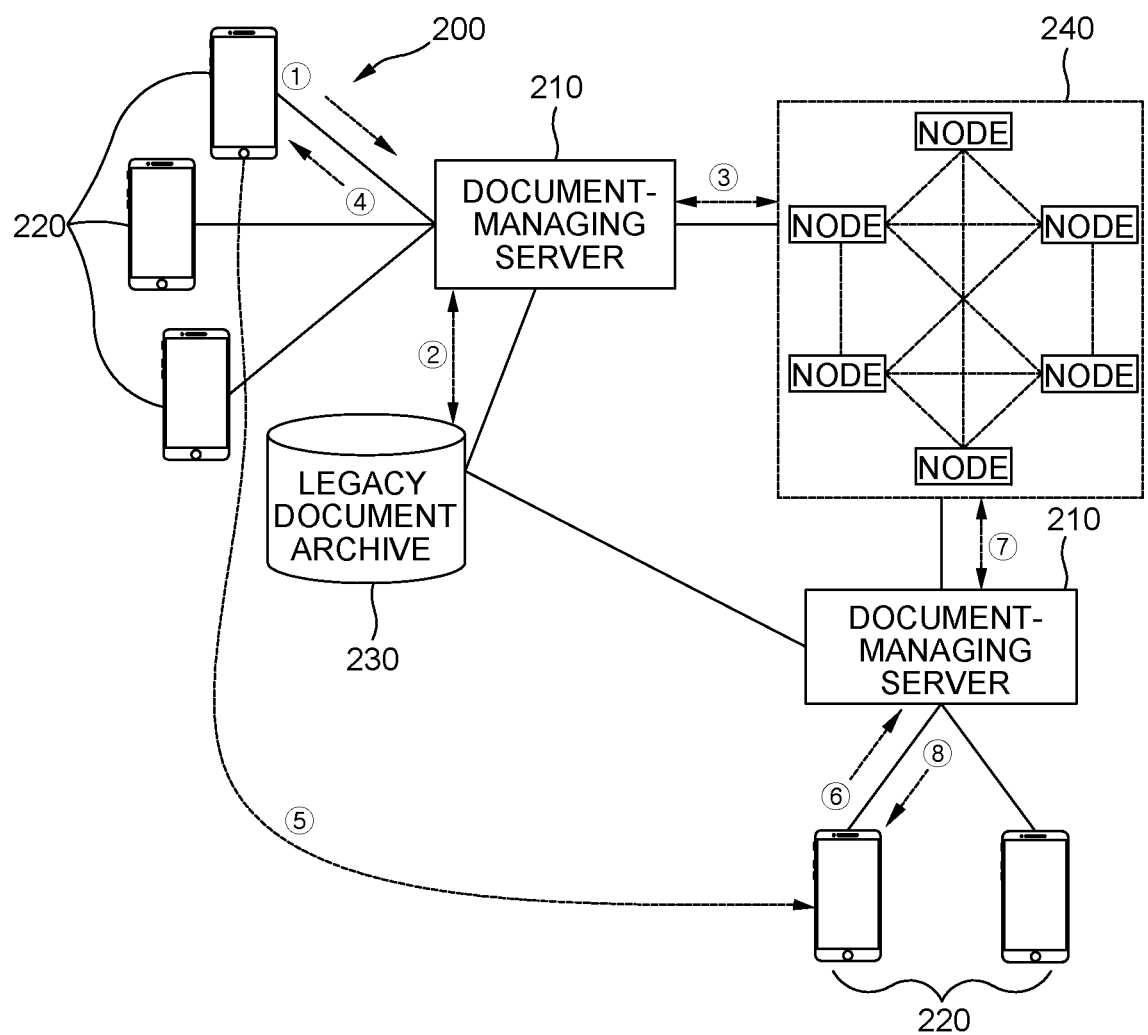
FIG. 2 is a conceptual diagram exemplarily illustrating a configuration of an entire system, including the document-managing server, a document-issuing server, a document-storing device, and a blockchain database, as a system for performing the method for managing the document in accordance with the first example embodiment and the second example embodiment of the present disclosure.

Next, FIG. 2 is a conceptual diagram exemplarily illustrating a configuration of an entire system, including the document-managing server 210, the user device 220, the document-issuing server/document-storing device 230, and the blockchain database 240, as a system for performing the method for managing documents in accordance with the present disclosure. FIG. 2 is just an example, and the document-managing server 210 may be a single computing device, or may also be comprised of the multiple computing devices which may be stand-alone or connected with each other cooperatively.

As will be described later, the document management method in accordance with the present disclosure includes steps as follows: ① in response to the document-issuing request from the user device, ② information on an original document which includes the document itself or its processed one is acquired, ③ a transaction regarding the document is recorded in the blockchain, and ④ access information for using the information on the original document is displayed to the document issuance requester via the user device 220. Herein, the indicated numbers of the steps of ③ the recordation in the blockchain and ④ the display of the access information are arbitrary, and those skilled in the art well understand that the steps ③ and ④ may be performed simultaneously, or the step ③ may be performed after the step ④.

Thereafter, ⑤ the access information may be provided from the document issuance requester to a document-viewing requester who is different from the document issuance requester, and ⑥ the document-viewing requester may request viewing of the information on the original document using the access information. Then, since the document is transmitted from the document issuance requester to the document-viewing requester, ⑦ the document-transmitting transaction corresponding to the document is recorded in the blockchain, and ⑧ the document-viewing requester may view the document using the information on the original document.

Details of whole processes as such will be explained as below.

First Example Embodiment

A method for issuing the document based on the blockchain in accordance with the first example embodiment of the present disclosure is described as follows.

Figure 3:
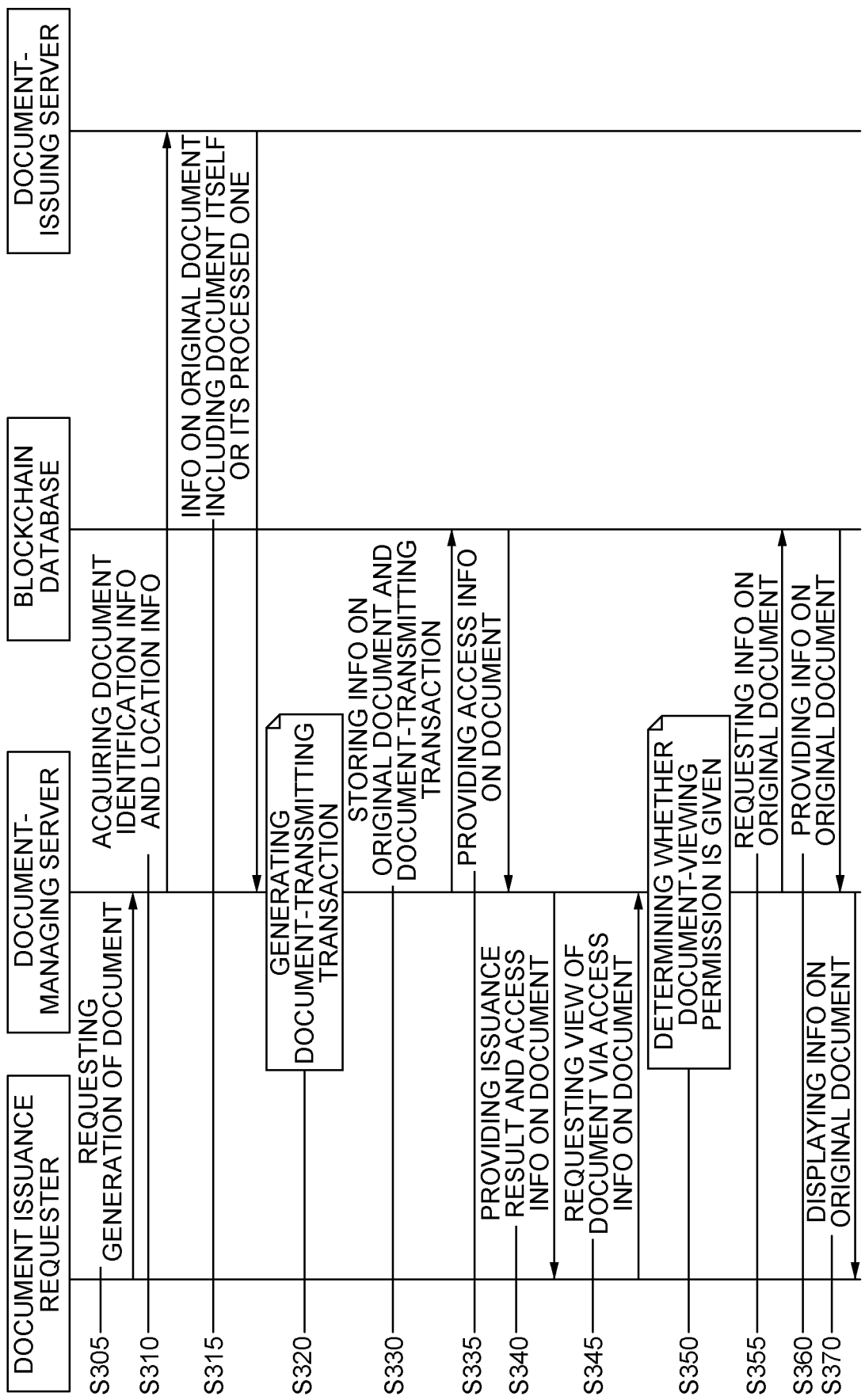
FIG. 3 is a sequence diagram schematically illustrating a method for issuing and viewing the document in accordance with the present disclosure.

FIG. 3 is a sequence diagram schematically illustrating the method for issuing and viewing the document in accordance with the present disclosure.

By referring to FIG. 3, in the method for issuing the document in accordance with the first example embodiment of the present disclosure, first, the document-managing server may acquire the document-issuing request of the document issuance requester at a step of S305. If the document-issuing request from the document issuance requester is acquired, the document-managing server may perform processes of instructing the document-issuing server, of a document-issuing institution which has an issuance permission of the document, to acquire identification information on the document where a management permission of the document is given to the document-issuing institution, and instructing the document-storing device to acquire location information representing where the document is generated or stored, by referring to the identification information on the document at a step of S310. Throughout the present specification, the location information may represent where the document is generated or stored by the document-storing device or by other storage devices. As a result, the document-managing server may acquire the information on the original document including the document itself or its processed one at a step of S315. Specifically, the information on the original document may include the document itself or information on a state of the processed document, which is generated or stored as corresponding to the location information.

Next, after the steps of S305 to S315, the method for issuing the document may further include steps as follows: the document-managing server generates contents of a document-transmitting transaction representing a transfer of the management permission of the document from the document-issuing institution as a transmitter of the document to the document issuance requester as a recipient of the document at a step of S320, and transmits the document-transmitting transaction to the blockchain database, to thereby instruct the blockchain database to store a document-transmitting transaction function value, created by applying a specific operation to the document-transmitting transaction, in the blockchain database itself at a step of S330. The document-transmitting transaction is disclosed in detail later by referring to drawings. Throughout the present disclosure, a specific function or a specific operation may be a hash function, a function value may be a hash value generated by using the hash function, a specific tree may be a Merkle tree or a Patricia tree, and a representative function value of the specific tree may be a root value of the Merkle tree, but the scope of the present disclosure is not limited thereto.

For reference, hash functions used in the present disclosure may include at least one of an MD4 function, an MD5 function, an SHA-0 function, an SHA-1 function, an SHA-224 function, an SHA-256 function, an SHA-384 function, an SHA-512 function, an HAS-160 function, and a Triple SHA256 function, but those skilled in the art understand that the scope of the present disclosure is not limited thereto.

Also, after the steps of S305 to S330, the method for issuing the document in accordance with the first example embodiment of the present disclosure may further include steps as follows: the document-managing server displays or supports another device connected with the document-managing server to display the access information, to be used for accessing an issuance result of the document and the information on the original document, to the document issuance requester at steps of S335 and S340. Herein, the access information may be, for example, a URL link provided for viewing the information on the original document, and may be retrieved from the blockchain database.

The aforementioned processes of S320 and S330 may be performed simultaneously or non-simultaneously with the processes of S335 and S340, and if the processes are performed non-simultaneously, their processing order may be arbitrary.

Meanwhile, the method for issuing the document in accordance with the first example embodiment of the present disclosure may further include a process (not illustrated) in addition to the aforementioned processes of S320, S330, S335, and S340 as follows: the document-managing server transmits the information on the original document to the blockchain database or another database connected with the document-managing server, to thereby allow the blockchain database or said another database to retain the information on the original document.

Herein, since the information on the original document is generated or stored by the document-issuing server as corresponding to the location information, the information on the original document may not have to be retained separately. However, as the case may be, the information on the original document may be retained separately.

Figure 5:
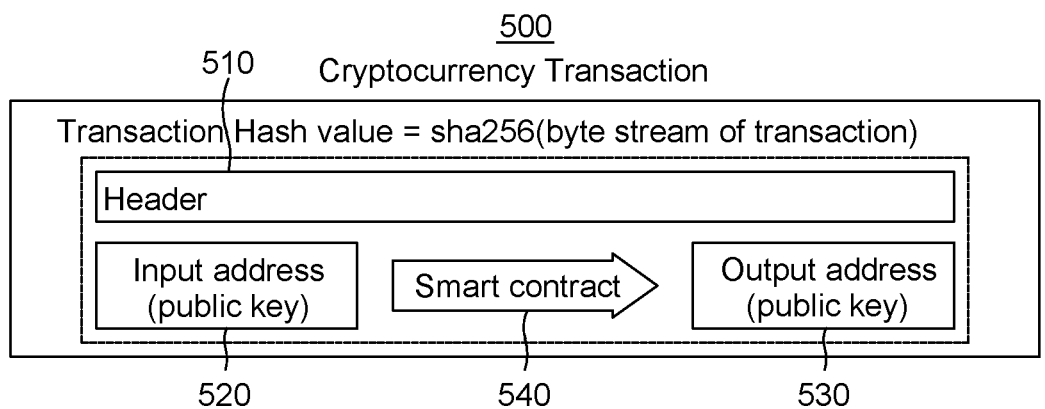
FIG. 5 is a conceptual diagram schematically illustrating a configuration of a document-transmitting transaction in accordance with the present disclosure.

FIG. 5 is a conceptual diagram schematically illustrating a configuration of the document-transmitting transaction in accordance with the present disclosure.

By referring to FIG. 5, the document-transmitting transaction 500 may include header information 510, a transaction input 520, a transaction output 530, and at least one redeeming condition-determining code 540 configured to determine at least one redeeming condition. FIG. 5 shows the redeeming condition-determining code as a smart contract, however, this is just an example, and the redeeming condition-determining code will be explained in more detail as follows.

Herein, the header information 510 may include transaction version information, transaction type information, and a time-stamp corresponding to a time of occurrence of the document-transmitting transaction.

Also, the transaction input 520 may include at least one of (i) information on personnel with a document-viewing permission representing who has the document-viewing permission of the document, (ii) a previous document-transmitting transaction function value created by applying the specific operation to each previous document-transmitting transaction which is referred to by the document-transmitting transaction, (iii) an output index of said each previous document-transmitting transaction, and (iv) at least one signature value of at least one document transmitter who transmitted the document.

As an example of the transaction input, the transaction input may include the document information, wherein the document information includes an issuance time and date of the document, a type of the document, a title of the document, a document-information function value created by applying the specific operation to the information on the original document, information on the document issuance requester who requested the document, a unique identifier of the document, information on the document-issuing institution, information on a document-issuing person in charge of issuing the document, information on authenticity of the document, and the access information on the document. Herein, the information on the document issuance requester may include a name of the document issuance requester and an identifier of the document issuance requester. Preferably, the identifier of the document issuance requester may be a universally unique identifier (UUID).

As another example of the transaction input, implemented alone or in combination with the aforementioned example of the transaction input, the transaction input may further include at least one piece of additional document information, wherein the additional document information includes (i) a transaction ID representing information on a location of the document-transmitting transaction function value, created by applying the specific operation to the document-transmitting transaction, in the blockchain database, (ii) a content section, and (iii) a signature section. Herein, the content section may include a public key of an author of the additional document information, a time-stamp corresponding to a time of creation of the additional document information, and a comment added by the author of the additional document information. Also, the signature section may include a signature value created by signing the content section with a private key of the author of the additional document information.

Figure 6:
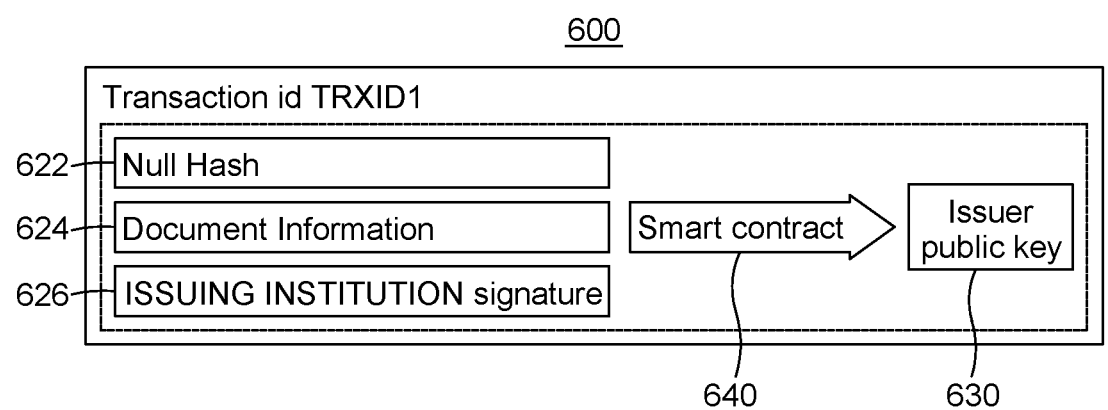
FIG. 6 is a conceptual diagram schematically illustrating a configuration of the document-transmitting transaction generated at a time of issuing the document in accordance with the present disclosure.

By referring to FIG. 6, as still another example of the transaction input, implemented alone or in combination with the aforementioned examples of the transaction input, the previous document-transmitting transaction function value included in the document-transmitting transaction 600, corresponding to an issuance of the document, among the document-transmitting transactions, may be a null function value 622, and a signature value of said at least one document transmitter may be a signature value 626 of the document-issuing institution wherein the signature value of said at least one document transmitter is included in the document-transmitting transaction 600. This is because no document-transmitting transaction of the document exists, before the document-transmitting transaction corresponding to the issuance. FIG. 6 includes the document information 624, and this is because the document-transmitting transaction 600 corresponds to the issuance of the document and the document-transmitting transaction has to include the contents of the document.

Next, the redeeming condition-determining code 540 in accordance with the present disclosure may be the smart contract, where the smart contract may be a source code which is compiled into bytecodes capable of an execution on at least one computing device. And the smart contract in accordance with the present disclosure may be configured to perform the management of the document according to whether the redeeming condition is satisfied, at a time of the execution, and wherein an integrity resulting from the execution may be verified by a consensus outputted from the at least one computing device.

Meanwhile, the redeeming condition may be at least one of (i) one or more document-transmitting and document-viewing conditions, (ii) one or more document restriction conditions, and (iii) a document fee-charging condition.

More specifically, the document-transmitting and document-viewing conditions may include at least one of (i) a condition for allowing the document to be viewed by at least one person, (ii) a condition for allowing transmission of the document to a third party, (iii) a condition for requiring a document-viewing person to log a fact that the document-viewing person viewed the document, (iv) a condition for requiring the document-viewing person to log a fact that the document-viewing person confirmed a content of the document, (v) a condition for restricting the document to be viewed by at least one predetermined specific entity only, (vi) a condition for restricting the document to be viewed by one or more entities belonging to a predetermined specific party only, (vii) a condition for preventing at least one predetermined certain entity from viewing the document, (viii) a condition for restricting the document to be viewed only if at least one predetermined particular entity allowed the document to be viewed, and (ix) a condition for restricting the number of the transmission of the document to be less than a predetermined number. Those skilled in the art may assume other restricting conditions on the transmission and the view, in addition to such conditions.

And the document restriction conditions may include at least one of (i) a condition for preventing the information on the original document from being printed, and (ii) a condition for allowing transmission of the information on the original document via e-mails, but those skilled in the art understand that the scope of the present disclosure is not limited thereto.

Also, the document fee-charging condition may be for charging a fee on at least one of the issuance, the view, and the revocation of the document, but those skilled in the art also understand that the scope of the present disclosure is not limited thereto.

And the aforementioned transaction output 530 may include an address of at least one document recipient, a name of the document recipient, and an identifier of the document recipient. This is similar to a fact that, in general, when a function value of a transaction is stored in the blockchain of the virtual currency as a result of buying and selling the virtual currency, who the buyer of the virtual currency is may be confirmed by recording an address of the recipient of part of the virtual currency in the transaction.

Herein, the address of said at least one document recipient may be each public key of each document recipient.

Next, the method for viewing the document, which is issued in accordance with the first example embodiment of the present disclosure as aforementioned, is disclosed.

By referring to FIG. 3 again, in the method for viewing the document in accordance with the first example embodiment of the present disclosure, first, a document-viewing request, including the access information, for the document may be acquired from the document-viewing requester at a step of S345. If the document-viewing request is acquired, the document-managing server may determine whether a document-viewing permission for the document is granted to the document-viewing requester at a step of S350. For reference, the order of the step of determining whether the document-viewing permission is granted is not limited to the order described in the present specification, and the step may be performed after the document generation step of S305.

Whether the document-viewing permission is granted to the document-viewing requester may be determined by referring to at least one of (i) a document-transmitting and document-viewing condition of a redeeming condition-determining code included in a last document-transmitting transaction among the document-transmitting transactions, and (ii) information on the personnel with the document-viewing permission in a transaction input included in the last document-transmitting transaction.

As one example, if the information on the personnel with the document-viewing permission of the transaction input does not include the document-viewing requester, then the document-viewing permission may be determined as not given to the document-viewing requester.

As another example compatible with this example, whether the document-viewing permission is granted to the document-viewing requester may be determined by referring to the document-transmitting and document-viewing condition of the redeeming condition-determining code included in the last document-transmitting transaction among the document-transmitting transactions.

By referring to FIG. 3 again, the method for viewing the document in accordance with the first example embodiment of the present disclosure may further include steps as follows: if the document-viewing permission is determined as granted to the document-viewing requester, the document-managing server transmits the access information for accessing the document to the blockchain database or another database at a step of S355, to thereby instruct the blockchain database or said another database to provide the information on the original document, corresponding to the access information, to the document-managing server or to another device connected with the document-managing server at a step of S360, and if the information on the original document is acquired, the document-managing server displays or supports another device to display the information on the original document to the document-viewing requester at a step of S370.

In the method for viewing the document as such, the document-viewing requester is described as the last recipient of the document thus far, however, if the document-viewing requester is different from the last recipient of the document thus far, the transmission of the document may need to be performed beforehand which transfers the management permission of the document to the document-viewing requester.

Figure 4:
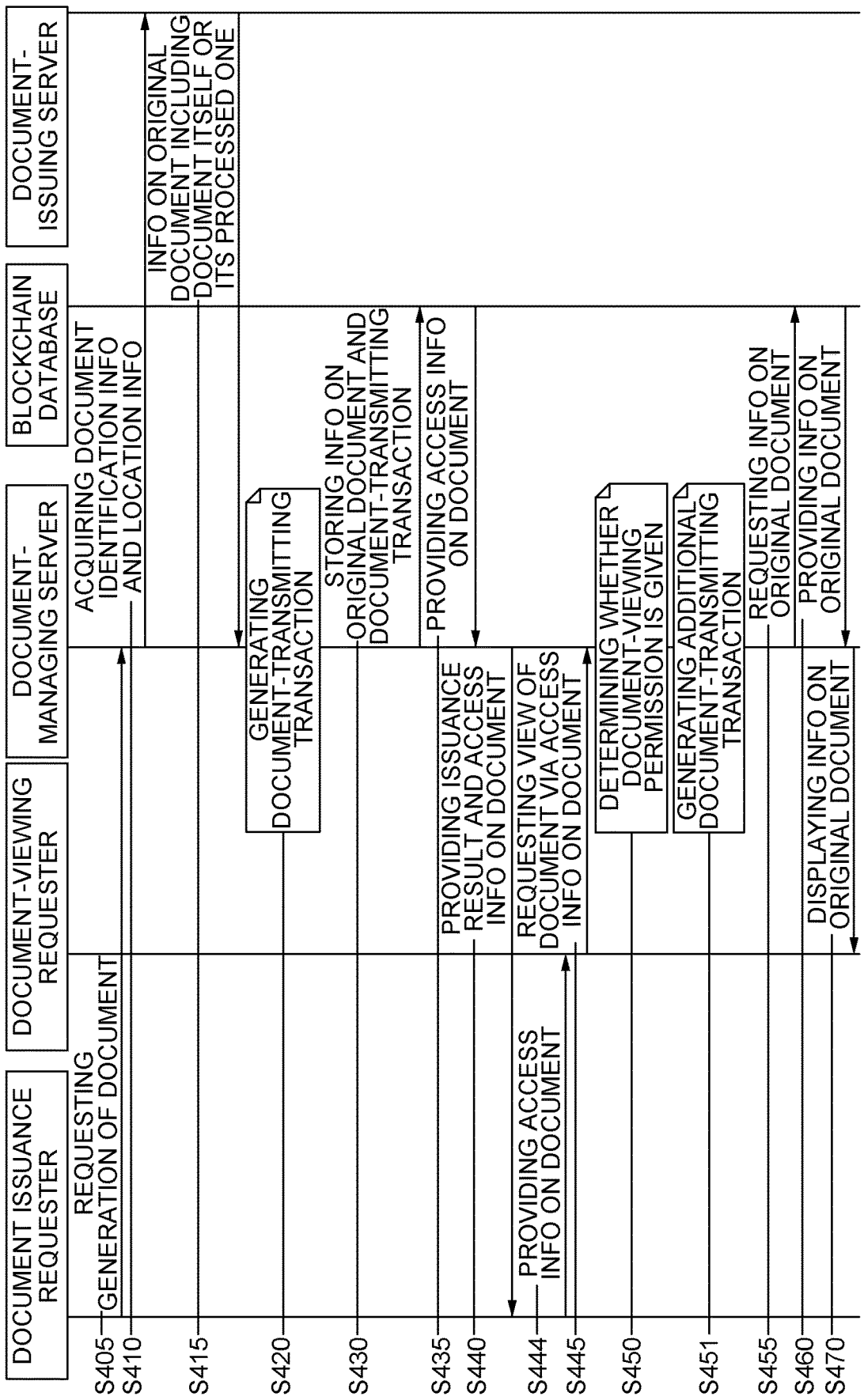
FIG. 4 is a sequence diagram schematically illustrating another example embodiment wherein a document issuance requester provides access information, for accessing the issued document, to a document-viewing requester of the method for issuing and viewing the document in accordance with the present disclosure.

Therefore, the method for viewing the document in accordance with the present disclosure with a few additional steps is shown in FIG. 4.

FIG. 4 is a sequence diagram schematically illustrating another example embodiment where the document issuance requester provides access information at a step of S444, for accessing the issued document, to the document-viewing requester of the method for issuing and viewing the document in accordance with the present disclosure. The steps indicated with similar reference numerals in FIGS. 3 and 4 are steps for performing identical or practically identical processes.

In the method for viewing the document in accordance with the first example embodiment of the present disclosure, the document-viewing request including the access information is acquired from the document-viewing requester different from the last recipient of the document thus far at the aforementioned step of S345, and the method for viewing the document may further include processes of S455 to S470 corresponding to the aforementioned steps of S355 to S370 as follows: a content of an additional document-transmitting transaction is generated at a step of S451 which is a document-transmitting transaction that transfers the management permission of the document, with the last recipient of the document thus far as the transmitter of the document and with the document-viewing requester as the recipient of the document, and the access information and the additional document-transmitting transaction are transmitted to the blockchain database, to thereby allow the blockchain database to provide the information on the original document itself or its processed one, corresponding to the access information, to the document-managing server at a step of S455, and to store the additional document-transmitting transaction in the blockchain database itself.

Figure 7A:
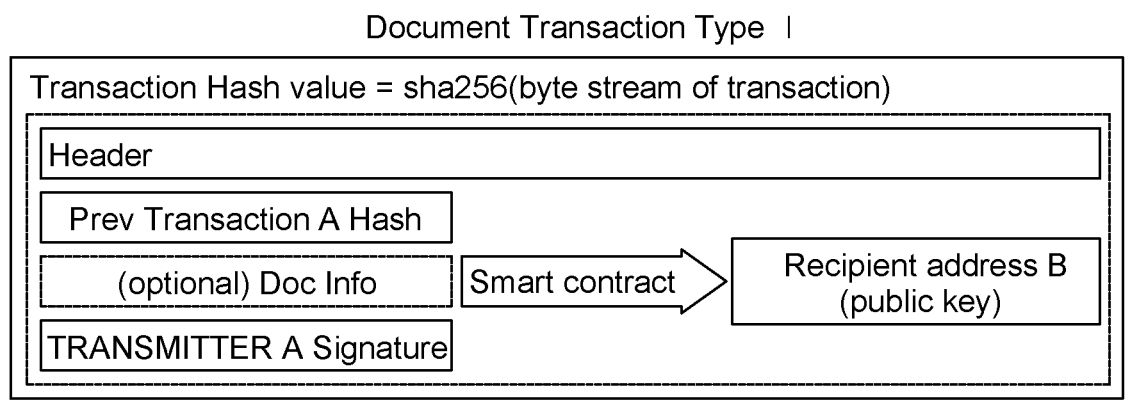
FIGS. 7A to 7C are conceptual diagrams for comparing a configuration of an additional document-transmitting transaction which is the document-transmitting transaction created at a time of transmitting the document, a configuration of the document-transmitting transaction created at the time of issuing the document, and a configuration of the document-transmitting transaction created at a time of revoking the document.
Figure 7B:
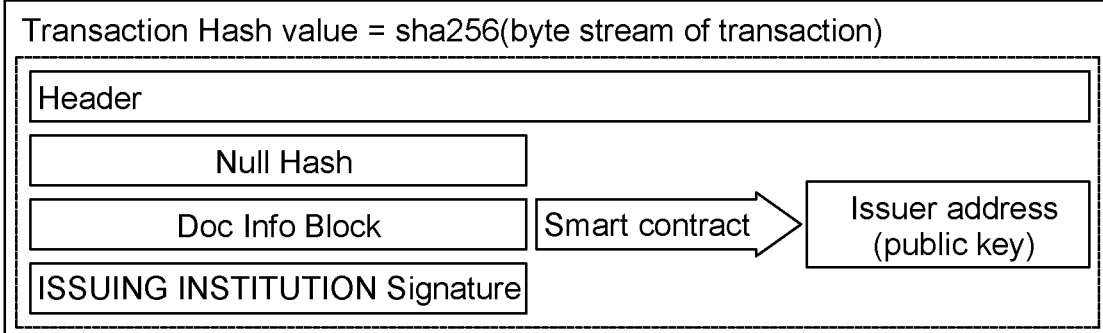
Figure 7C:
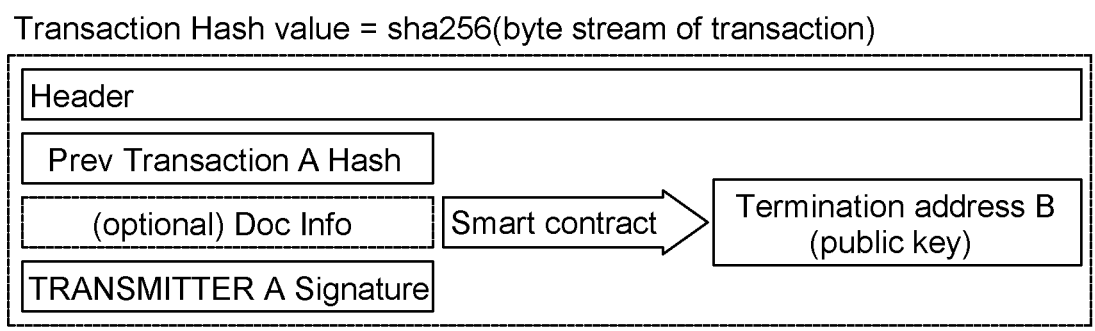

FIGS. 7A to 7C are conceptual diagrams for comparing a configuration of the additional document-transmitting transaction, a configuration of the document-transmitting transaction created at a time of the issuance of the document as aforementioned, and a configuration of the document-transmitting transaction created at a time of the revocation of the document to be described later.

By referring to FIG. 7A, the transaction input of the additional document-transmitting transaction as such may include a value created by applying the specific operation to a last document-transmitting transaction as a previous document-transmitting transaction function value, because the additional document-transmitting transaction is not a document-transmitting transaction corresponding to the initial issuance of the document and thus at least one document-transmitting transaction to be referred to is present. For reference, since the document information may be added if the document-viewing requester desires, it is shown as an optional element in FIG. 7A.

An additional input of the document-viewing requester may be stored in the additional document-transmitting transaction. That is, at the processes of S451 and S455, if the additional input from the document-viewing requester is acquired, the document-managing server may incorporate additional document information into the additional document-transmitting transaction, such that a content section of the additional document information includes the additional input.

For reference, for comparison of FIG. 7A aforementioned and FIG. 7C to be described later, FIG. 7B shows a document-transmitting transaction which is same as the document-transmitting transaction at the time of the issuance shown in FIG. 6.

Next, the method for revoking the document which is issued in accordance with the first example embodiment of the present disclosure is described by referring to FIG. 7C.

As aforementioned, FIG. 7C is a conceptual diagram schematically illustrating a configuration of the document-transmitting transaction generated at the time of revoking the document.

By referring to FIG. 7C, the revocation of the document is performed by the generation of the document-transmitting transaction which transfers the management permission of the document, with an address for revocation as the address of the recipient. Therefore, the revocation is performed similarly to what is described of the additional document-transmitting transaction.

Specifically, the method for revoking the document based on the blockchain in accordance with the first example embodiment of the present disclosure may include steps (not illustrated) as follows: on condition that the information on the original document including the document itself or its processed one of the document has been issued in response to the document-issuing request from the document issuance requester, and at least one document-transmitting transaction function value created by applying the specific operation to at least one document-transmitting transaction has been stored in the blockchain database where the document-transmitting transaction has either (i) the document-issuing institution as the transmitter of the document and the document issuance requester as the last recipient of the document thus far, or (ii) a first specific recipient as the transmitter of the document and a second specific recipient as the last recipient of the document thus far, if a document-revoking request including the access information for accessing the document is acquired from the document revocation requester, the document-managing server determines whether a document-revoking permission for the document is granted to the document revocation requester.

As one example, the document-revoking permission may be determined as held by an entity who has the management permission of the document. As a result, the last recipient of the document thus far may have a permission to revoke the document.

As another example, a certain kind of documents may be prearranged such that a document-issuing person in charge within the document-issuing institution has the document-revoking permission of said certain kind of documents. For example, according to legal merits to revoke the documents including government secrets, in the method for revoking the document in accordance with the present disclosure, a person in charge within the government may be set as having the revocation permission to revoke the documents at once.

Next, the method for revoking the document in accordance with the first example embodiment of the present disclosure may further include steps (not illustrated) as follows: if the revocation permission is determined as granted to the document revocation requester, the document-managing server transmits a document-revoking transaction which is a document-transmitting transaction for transferring the management permission of the document to the blockchain database with the last recipient of the document thus far as the transmitter of the document and with the address for revocation as an address of the recipient of the document, to thereby allow the blockchain database to store a document-revocation function value, created by applying the specific operation to the document-revoking transaction, in the blockchain.

Herein, a private key corresponding to the address for revocation may be destroyed on purpose, to prevent recovering a revoked document by transmitting the revoked document to another recipient.

Meanwhile, the private key corresponding to the address for revocation may be retained by a managing entity, to allow recovering the revoked document by transmitting the revoked document to another recipient. For example, such a managing entity may be the document-issuing institution, which operates the document-managing server or the document-issuing server, however, the managing entity may be still another entity.

So far, a single document-viewing requester is assumed in the description of the present disclosure, however, the document recipient who requests viewing of the document may be one or more, and the document transmitter, as the managing entity of the document, who wants to transmit the document to at least one document recipient may also be one or more.

Figure 8A:
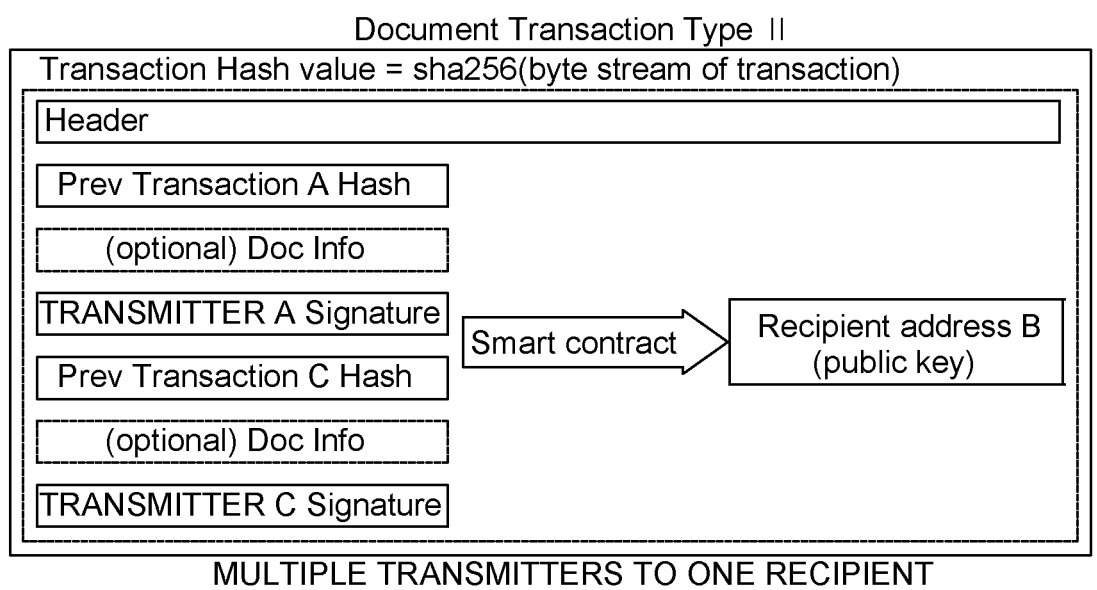
FIGS. 8A to 8C are conceptual diagrams for comparing a configuration of the document-transmitting transaction in which the document is transferred to a single document recipient by agreement of multiple document transmitters, a configuration of the document-transmitting transaction in which the document is transferred to multiple document recipients from a single document transmitter, and a configuration of the document-transmitting transaction in which the document is transferred to the multiple document recipients from the multiple document transmitters.
Figure 8B:
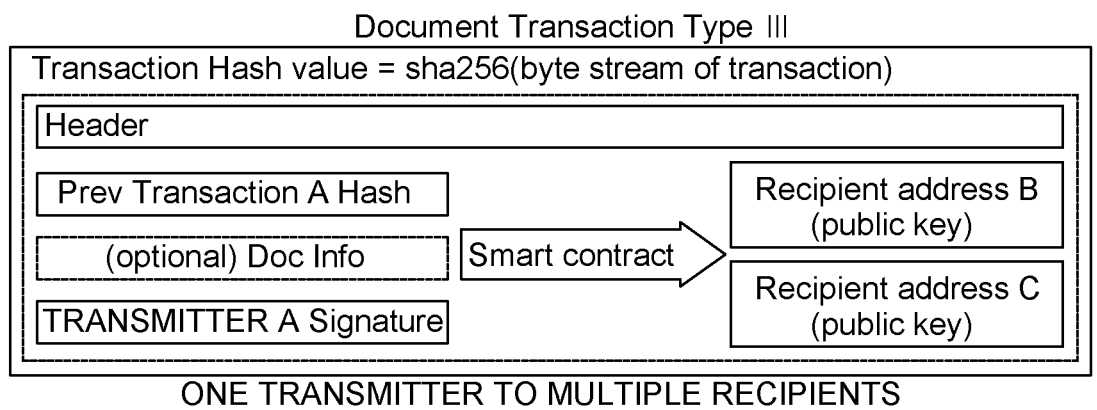
Figure 8C:
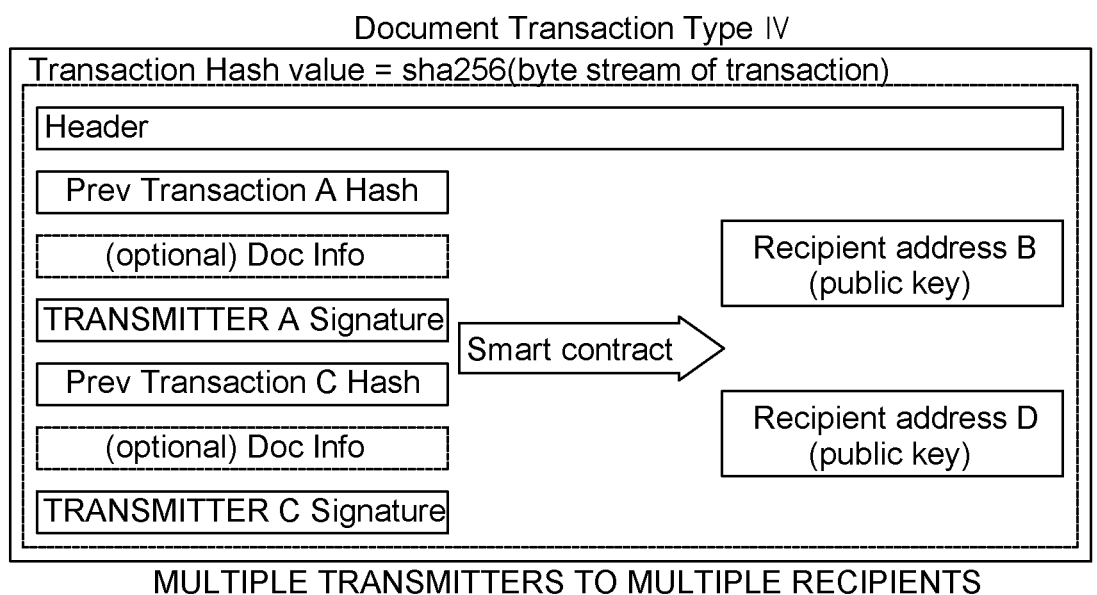

For reference, FIGS. 8A to 8C are conceptual diagrams for comparing a configuration of the document-transmitting transaction in which the document is transferred to a single document recipient by agreement of multiple document transmitters, a configuration of the document-transmitting transaction in which the document is transferred to multiple document recipient from a single document transmitter, and a configuration of the document-transmitting transaction in which the document is transferred to the multiple document recipient from the multiple document transmitters.

At the time of requesting the issuance of the document, the single document issuance requester or multiple document issuance requesters may designate the document recipient who initially receives the management permission of the document as a single person or multiple persons, and this is practically same as a principle of receiving one or more UTXOs as input and outputting one or more UTXOs as merged/split outputs.

First, FIG. 8A schematically illustrates the configuration of the document-transmitting transaction in which the document is transferred to the single document recipient by the agreement of the multiple document transmitters.

The multiple document transmitters may be referred to by the information on the personnel with the document-viewing permission, where the information on the personnel may be one of inputs included in the document-transmitting transaction, and past document-transmitting transactions corresponding to the document whose management permission is held by the multiple document transmitters may be referred to by the previous document-transmitting transaction function value which is one of the transaction inputs. Each signature value of the multiple document transmitters may also be included in the transaction input, as schematically illustrated in FIG. 8A.

Next, FIG. 8B schematically illustrates the configuration of the document-transmitting transaction in which the document is transferred from the single document transmitter to the multiple document recipients.

Herein, outputs of the document-transmitting transaction may include the addresses, for example, public keys, of the multiple document recipients, and as previously described in the configuration of the document-transmitting transaction, may also include a name and an identifier of at least one of the multiple document recipient.

Next, since the configuration of the document-transmitting transaction shown in FIG. 8C is similar to a combination of the aforementioned configurations shown in FIGS. 8A and 8B, those skilled in the art understand the case of FIG. 8C by referring to the description of FIGS. 8A and 8B.

Figure 9:
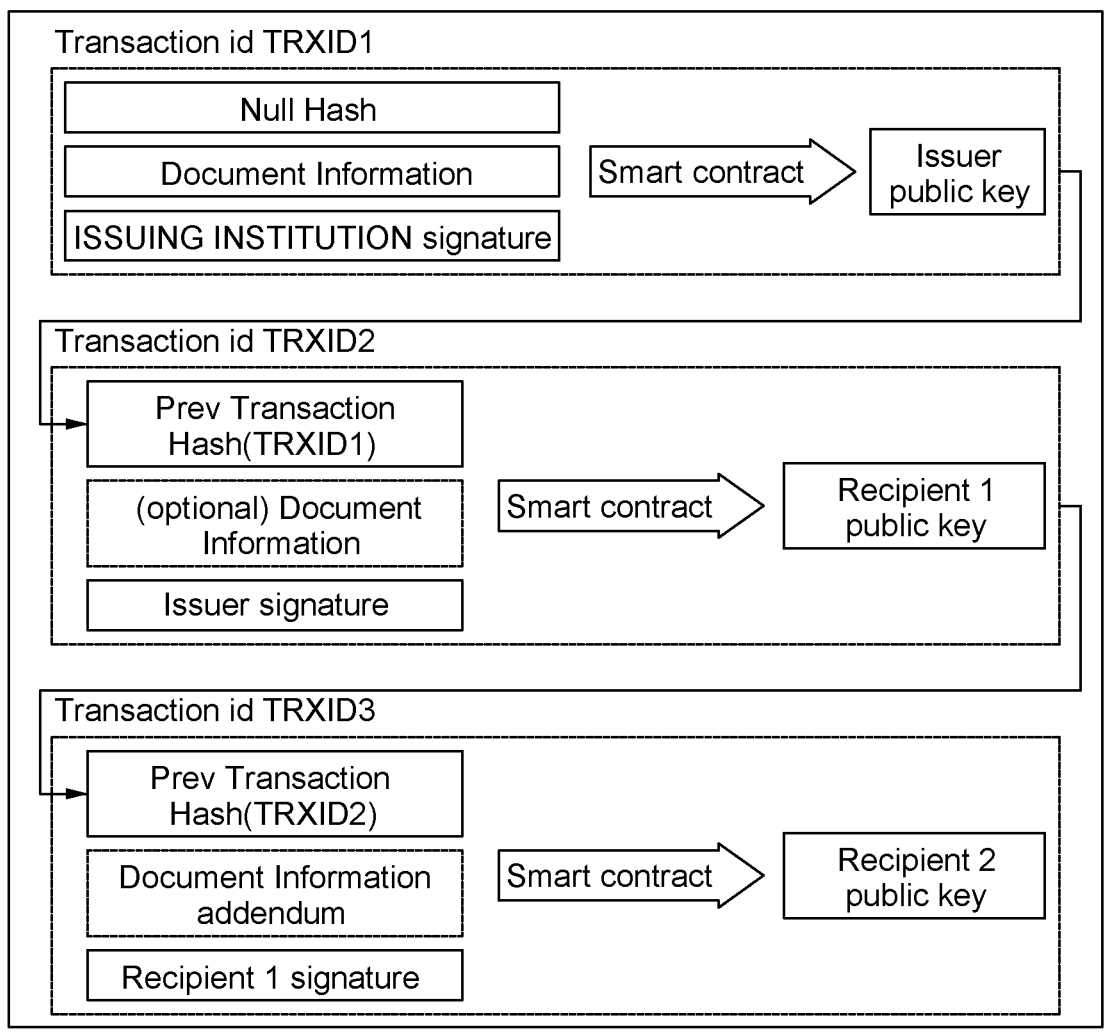
FIG. 9 is a drawing schematically illustrating a process of viewing history of entire document-transmitting transactions.

Next, FIG. 9 is a drawing schematically illustrating a process of viewing history of entire document-transmitting transactions.

By referring to FIG. 9, since every document-transmitting transaction except the document-transmitting transaction TRXID1 corresponding to the initial issuance, refers to its corresponding previous document-transmitting transaction using its function value thus, the TRXID1, a TRXID2, and a TRXID3, that is, every document-transmitting transaction generated with regard to the document may be tracked and managed by referring to the respective previous document-transmitting transaction function values of the individual document-transmitting transactions, simply using information on the last document-transmitting transaction only, for example, the TRXID3. That is, the history of the entire document-transmitting transactions may be viewed.

Second Example Embodiment

Next, the method for issuing the document based on the blockchain in accordance with the second example embodiment of the present disclosure is described as follows. Below, the technological characteristics identical to those of the aforementioned first example embodiment will be omitted, and only specific details will be disclosed. The blockchain of the first example embodiment may correspond to a first blockchain of the second example embodiment, and the second example embodiment further describes connection of the first blockchain with the second blockchain.

By referring to FIG. 3 again, the method for issuing the document in accordance with the second example embodiment of the present disclosure may include steps as follows: the document-managing server allows the blockchain database to store the document-transmitting transaction hash value in the first blockchain at a process of S330, and if one of anchoring conditions is satisfied, allows the blockchain database to store a representative hash value or its processed value in the second blockchain at a process of S330' (not illustrated) where the representative hash value is calculated by using both (i) a specific hash value which is the document-transmitting transaction hash value and (ii) its at least one corresponding neighboring hash value which is a hash value of a specific document-transmitting transaction different from the document-transmitting transaction.

The calculation by using both the specific hash value and at least one of the neighboring hash values may be performed by various functions. Supposing that the specific hash value is an input, and that the neighboring hash values are x1, x2, . . . , xn, then a representative hash value t may be expressed as a following equation.

<Equation 1>

$$t = \text{hash}(\text{function}(\text{input}, x1, x2, \ldots, xn))$$

Herein, the document-managing server or the blockchain database may record and manage the specific hash value and its corresponding at least one neighboring hash value in a certain data structure. Herein, the data structure may vary and one example may be a Merkle tree. In this case, the calculation using both (i) the specific hash value and (ii) at least one hash value of at least one neighboring node which corresponds to a node of the specific hash value may be performed by using the Merkle tree.

That is, the document-managing server or the blockchain database may perform or support another device to perform processes of (i) a process of creating at least one Merkle tree by allotting the specific hash value to its leaf node, and (ii) a process of recording, if one of the anchoring conditions is satisfied, the representative hash value or its processed value calculated by using both (ii-1) the specific hash value of a specific leaf node and (ii-2) at least one hash value allocated to at least one of other leaf nodes corresponding to the specific leaf node, in the second blockchain.

The document-managing server or the blockchain database may record the hash value allocated to the root node as the representative hash value in the second blockchain. Herein, a processed value of the representative hash value may be recorded. For example, a resultant value from hex operation on the representative hash value may be recorded.

Meanwhile, a first data structure and a second data structure may be connected in a form of a chain, if the document-managing server or the blockchain database stores the specific hash value and the at least one neighboring hash value in the first data structure and then stores and manages the second data structure identical in a form to the first data structure.

Especially, as the example aforementioned, if the first data structure and the second data structure are Merkle trees, a root value of the first data structure or a hash value of the root value may be allocated to a first leaf node of the second data structure.

Moreover, data integrity may be further ensured by verifying the first data structure when the second data structure is created.

Further, if the Merkle tree is a first tree among two or more Merkle trees linked in chains, a hash value or its processed value of a message data, which includes text, numbers or symbols, may be allocated to a first leaf node of the Merkle tree. For example, at the time of creation of the Merkle tree, a hash value of an input message initially given by the document-managing server or the blockchain database may be allocated.

Figure 10:
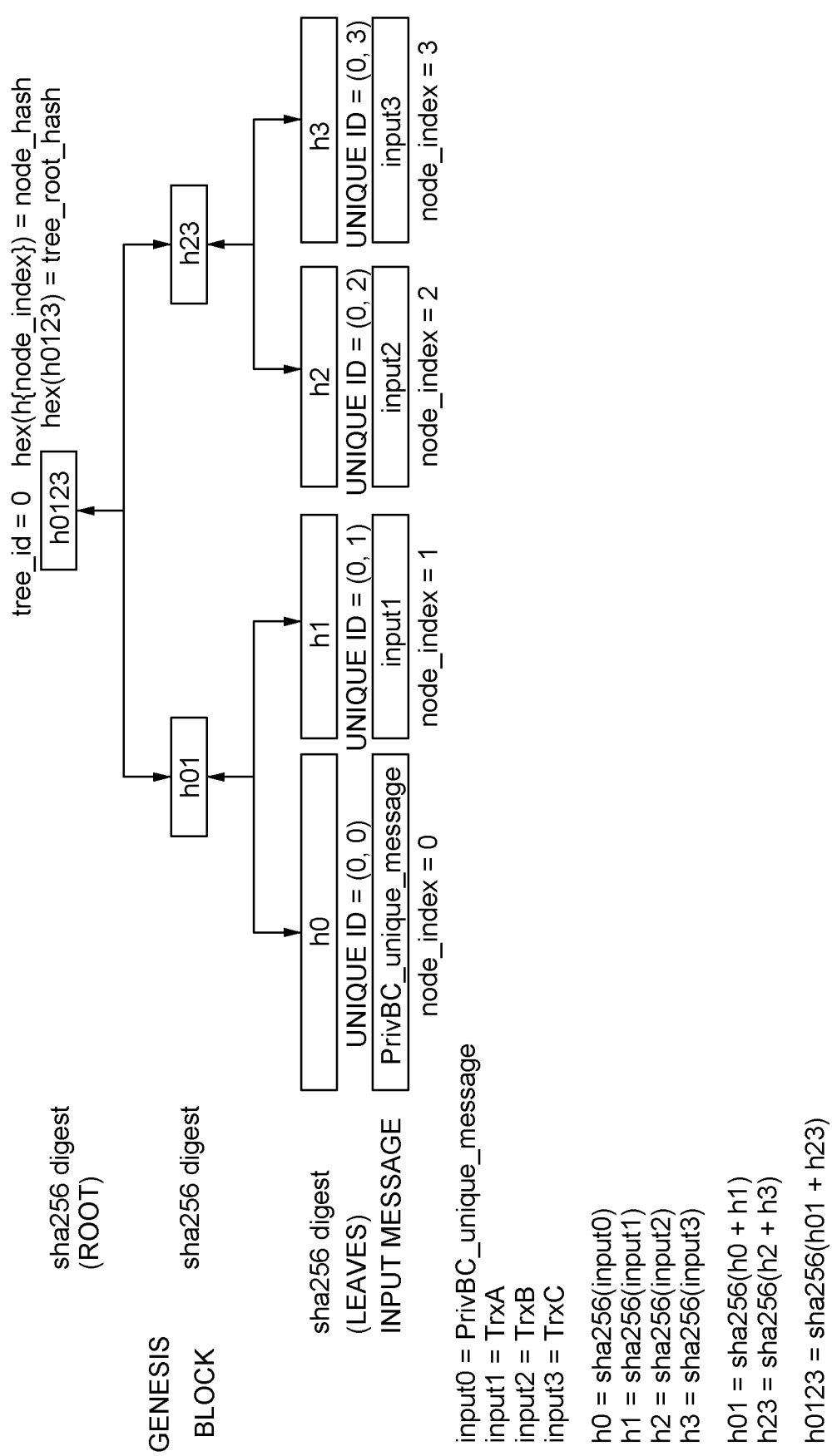
FIGS. 10 and 11 are drawings schematically illustrating a process of recording the document-transmitting transaction in a blockchain in accordance with the second example embodiment of the present disclosure.
Figure 11:
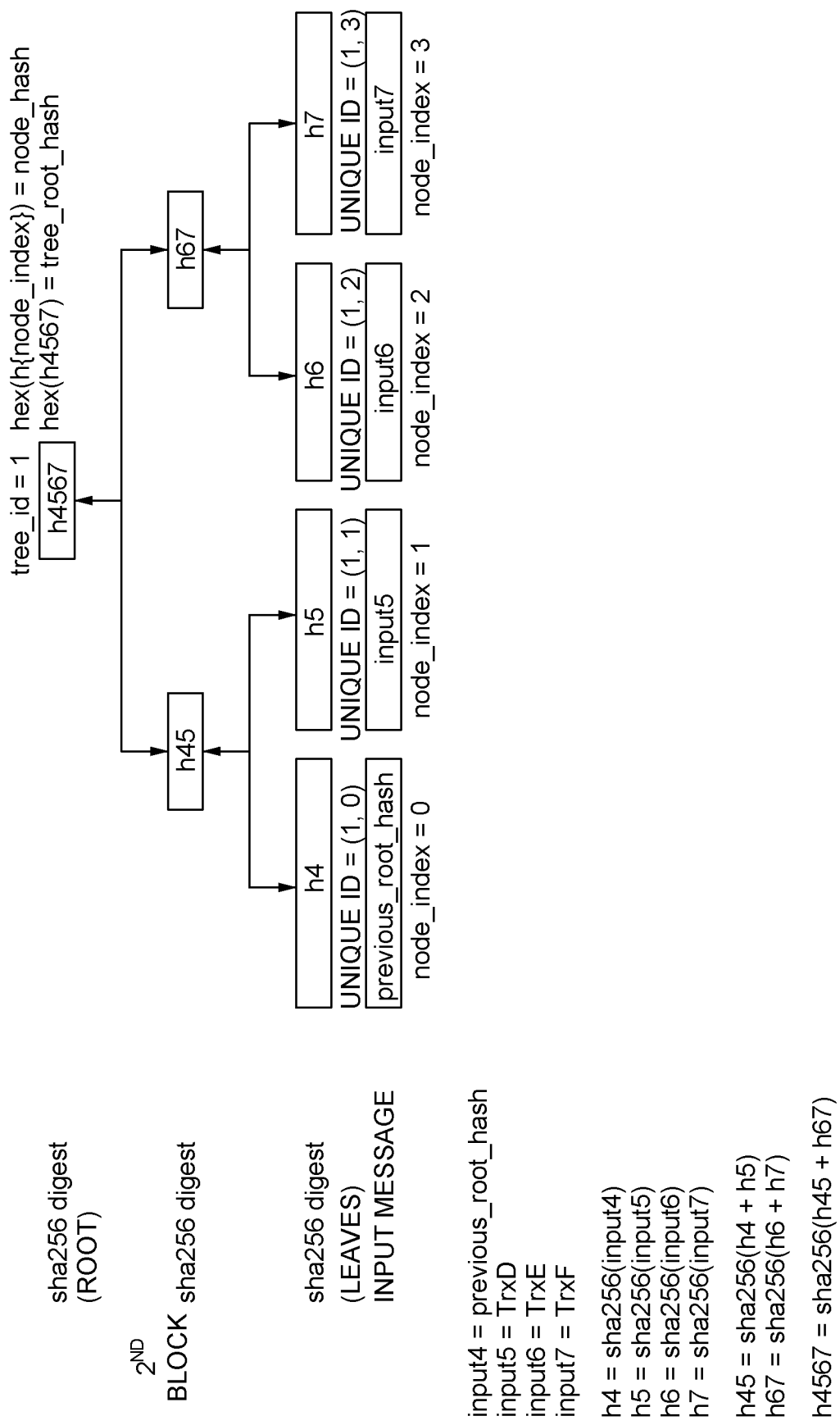

FIGS. 10 and 11 are drawings illustrating an example of a Merkle tree created in accordance with the present disclosure.

FIG. 10 illustrates a Merkle tree with four (two to the power of two) leaf nodes. As the illustrated Merkle tree is a first Merkle tree whose tree_id is zero, a hash value sha256 (PrivBC_unique_message) of PrivBC_unique_message is allocated to an h0 node which is a first leaf node. If transactions are being recorded, the document-managing server or the blockchain database may create a leaf node next to a last leaf node of the Merkle tree currently being configured and may allocate the specific hash value or its processed value to the created leaf node. For example, if an allocation of values is completed with the h1 node as a last which is a second leaf node of the Merkle tree in FIG. 10, and if a new leaf node is to be created, then an h2 node which is a next leaf node may be created and the specific hash value or its processed value sha256(input2) may be allocated to the h2 node. Further, the document-managing server or the blockchain database may calculate or support another device to calculate by using both (i) a specific hash value and (ii) a hash value allocated to an h3 node which is a sibling node of the h2 node which is a third leaf node to which the specific hash value is allocated. The hash value of the calculated value above may be allocated to an h23 node which is a parent node of the h2 node and the h3 node. Since the parent node, i.e., the h23 node, is not the root node of the Merkle tree, the document-managing server or the blockchain database may repeat the processes by regarding the hash value allocated to the h23 node as the specific hash value. That is, with the hash value allocated to the h23 node as a specific hash value, the hash values allocated to the h23 node and an h01 node may be used together to be calculated and allocated to an h0123 node which is a parent node of the h23 node and the h01 node. Herein, as the h0123 node is the root node, the document-managing server or the blockchain database may record the processed value hex (h{node_index}) of the hash value allocated to the h0123 node in the second blockchain.

To explain this in a recursive way, if one of the anchoring conditions is satisfied, the document-managing server or the blockchain database may (x1) calculate an intermediate value by using (i) the specific hash value and (ii) a hash value allocated to a sibling node of the specific leaf node, and then allocate a hash value of the intermediate value to a parent node of the specific leaf node, (x2) record the hash value of the intermediate value in the second blockchain as the representative hash value if the parent node is a root node of the Merkle tree, and (x3) repeat steps from (x1) to (x3) by regarding the hash value of the intermediate value as the specific hash value and regarding the parent node as the specific leaf node if the parent node is not the root node.

Meanwhile, the anchoring conditions may include one of (i) a condition that a certain number of the specific hash value and the neighboring hash value are acquired or generated, (ii) a condition that a certain amount of time is elapsed, (iii) a condition that a block is created in the first blockchain, and (iv) a condition that has at least one of characteristics of services.

In the second example embodiment, if the hash values including the document-transmitting transaction hash value are acquired as many as the number of the leaf nodes, then each of the hash values including the document-transmitting transaction hash value may be each input value, i.e., each value allocated to each of the leaf nodes, to the aforementioned Merkle tree.

Also, the document-managing server or the blockchain database may create a root value of the Merkle tree aforementioned at stated intervals, by referring to the condition (ii) above. In this case, if a certain amount of time is elapsed, the document-managing server or the blockchain database may create the Merkle tree by referring to input values by the time, and may record the root value of the Merkle tree on the second blockchain.

However, in this case, no value may be allocated to a sibling node of the node to which the specific hash value is allocated even though the certain amount of time is elapsed. In case no hash value is allocated to the sibling node even though one of the anchoring conditions is satisfied, the document-managing server or the blockchain database may allocate a certain hash value to the sibling node to thereby produce a root value of the Merkle tree by the method aforementioned. For example, the document-managing server or the blockchain database may copy and allocate the specific hash value to the sibling node.

The characteristics of services may be at least part of (i) information on cost paid by entities who use the document management method or the document-managing server in accordance with the present disclosure, (ii) information on a time-zone during which recording of the document-transmitting transaction or its hash value is performed, (iii) information on a location where the recording of the transaction is performed, and (iv) information on a type of a person or a company which is a managing entity of a server involved in the recording, for example, the document-managing server, the document-issuing server, the document-storing device, etc. However, the scope of the present disclosure is not limited thereto.

Meanwhile, if a creation of a new Merkle tree starts and if one of the anchoring conditions is satisfied with no document-transmitting transaction having been received, the document-managing server or the blockchain database may create the new Merkle tree by allotting certain message data to its first and second leaf nodes and may record the root value of the new Merkle tree or its processed value in the second blockchain. In this case, the new Merkle tree with two leaf nodes may be created.

Meanwhile, a first data structure and a second data structure may be connected in a form of a chain, if the document-managing server or the blockchain database stores the specific hash value and the at least one neighboring hash value in the first data structure and then stores and manages the second data structure identical in a form to the first data structure as aforementioned. Especially, if the first data structure and the second data structure are Merkle trees, a root value of the first data structure or a hash value of the root value may be allocated to a first leaf node of the second data structure.

FIG. 11 is a drawing illustrating an example of a Merkle tree created in a form of the second data structure in accordance with the present disclosure.

By referring to FIG. 11, it is clear that the root value hex(h0123) of the Merkle tree whose tree_id is zero in FIG. 10 is allocated to the first leaf node which is an h4 node of a new Merkle tree. In such a manner, the present disclosure has advantage of improving data integrity, as tracking becomes easier even in a case of data forgery, by connecting multiple data structures created when a document-transmitting transaction occurs.

Also, the method for issuing the document in accordance with the second example embodiment of the present disclosure may further include a step (not illustrated) as follows: the document-managing server verifies integrity of the first blockchain by comparing periodically or in response to a request from the managing entity (i) a first representative hash value or its processed value calculated by using both (i-1) a hash value of at least one document-transmitting transaction recorded in the first blockchain and (i-2) its corresponding at least one neighboring hash value and (ii) its corresponding second representative hash value or its processed value recorded in the second blockchain.

Although the step of verifying the integrity of the blockchain is described from a perspective of the method for issuing the document, the step may be applied to the method for viewing the document or to the method for revoking the document in a same manner.

As one example, the first blockchain and the second blockchain may be a private blockchain or a public blockchain. Herein, the first blockchain may be the private blockchain database and the second blockchain may be the public blockchain database.

Next, the method for viewing the issued document in accordance with the second example embodiment of the present disclosure is explained, but the technological characteristics identical to those of the aforementioned first example embodiment will be omitted, and only specific details will be disclosed.

By referring to FIG. 4 again, a case is described where the document issuance requester provides the access information at the step of S444, for accessing the issued document, to the document-viewing requester, in the method for viewing the issued document in accordance with the second example embodiment of the present disclosure.

In the method for viewing the document in accordance with the second example embodiment of the present disclosure, if the document-viewing request for the document including the access information is acquired from the document-viewing requester different from the last recipient of the document thus far, a content of the additional document-transmitting transaction is generated at a step of S451, the access information of the document and the additional document-transmitting transaction are transmitted to the blockchain database, to thereby allow the blockchain database to provide the document-managing server with the information on the original document including the document itself or its processed one corresponding to the access information for the document and to record the additional document-transmitting transaction in the first blockchain at a step of S455, and if one of the anchoring conditions is satisfied, allows the blockchain database to store a representative hash value or its processed value in the second blockchain at a process of S455' (not illustrated) where the representative hash value is calculated by using both (i) a specific hash value which is the additional document-transmitting transaction hash value and (ii) its at least one corresponding neighboring hash value which is a hash value of a specific document-transmitting transaction different from the additional document-transmitting transaction.

Next, the method for revoking the document which is issued in accordance with the second example embodiment of the present disclosure is described. Specifically, the method for revoking the document based on the blockchain in accordance with the second example embodiment of the present disclosure may include steps as follows: along with storing of the document-transmitting transaction hash value in the first blockchain, if one of the android conditions is satisfied, the blockchain database is instructed to store a representative hash value or its processed value in the second blockchain where the representative hash value is calculated by using both (i) a specific hash value which is a document-revoking transaction hash value and (ii) its at least one corresponding neighboring hash value which is a hash value of a specific document-transmitting transaction different from the document-revoking transaction.

The present disclosure has an effect of improving reliability and security of a document management system by preventing unauthorized copy or forgery in addition to strong non-repudiation and prevention of falsification, in all of the aforementioned embodiments of the present disclosure.

Advantages of the technique disclosed herein with the above embodiments are guarantees of reliability of the document management system by essentially blocking forgery of document-related information, such as public keys, hash values, etc., and enhancement of integrity through prevention of errors in the document management by allowing recordation of transactions in the blockchain.

The present disclosure has an effect of strictly managing permission required for issuing, viewing, and revoking a document by using a smart contract, to thereby prevent an unauthorized person from generating, viewing, and revoking the document. In other words, the present disclosure has an effect of providing a function for non-repudiation, by confirming that the document is generated by an authorized person and distributed without tampering once the document is issued.

The present disclosure has another effect of periodically verifying an authenticity of an electronic document, to thereby guarantee that the electronic document is not forged or falsified.

The present disclosure has still another effect of guaranteeing security, by forcing every entity participating in issuing, viewing and revoking of the electronic document to use cryptographical technologies like a public key-private key pair algorithm, e.g., RSA, ECC, and hash functions, etc.

Based on the explanation of the above embodiments, those skilled in the art can clearly understand that the present disclosure may be implemented by combination of software and hardware or hardware alone. The part contributing to the prior art or the object of a technical solution of the present disclosure may be implemented in a form of executable program command through a variety of computer components and may be recorded in computer readable media. The computer readable media may include solely or in combination, program commands, data files, and data structures. The program commands recorded to the media may be components specially designed for the present invention or may be known and usable to a skilled human in a general field. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands may include not only a machine language code made by a complier but also a high level code that can be used by an interpreter etc., which is executed by a computer. The aforementioned hardware device can work as more than a software module to perform the action of the present disclosure and they can do the same in the opposite case. The hardware device may include a processor such as a CPU or a GPU, combined with a memory device such as ROM or RAM to store the program commands, configured to execute the commands stored in the memory, and a communication part which can exchange signals with external devices. In addition, the hardware device may include a keyboard, a mouse, and any other external input device to receive commands prepared by developers.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for issuing a document based on a blockchain, comprising steps of:

(a) when a document-issuing request from a document issuance requester is acquired, instructing, by a document-managing server, a document-issuing server of a document-issuing institution which has an issuance permission of the document to acquire identification information on the document wherein a management permission of the document is given to the document-issuing institution, and instructing a document-storing device to acquire location information representing where the document is generated or stored by referring to the identification information on the document, to thereby acquire information on an original document including the document itself or information on a state of the processed document which is generated or stored as corresponding to the location information; and (b) (i) generating, by the document-managing server, contents of a document-transmitting transaction representing a transfer of the management permission of the document from the document-issuing institution as a transmitter of the document to the document issuance requester as a recipient of the document, and transmitting the document-transmitting transaction to a blockchain database, to thereby instruct the blockchain database to store a document-transmitting transaction function value, created by applying a specific operation to the document-transmitting transaction, in the blockchain database itself, and (ii) displaying, by the document-managing server, or supporting another device connected with the document-managing server to display, access information, to be used for accessing an issuance result of the document and the information on the original document, to the document issuance requester, wherein the document-transmitting transaction includes header information, a transaction input, a transaction output, and at least one redeeming condition-determining code configured to determine at least one redeeming condition, wherein the redeeming condition is at least one of one or more document-transmitting and document-viewing conditions, one or more document restriction conditions, and a document fee-charging condition.

2. The method of claim 1, wherein the step of (b) further includes a process of:

(iii) the document-managing server transmitting the information on the original document to the blockchain database or another database connected with the document-managing server, to thereby allow the blockchain database or said another database to retain the information on the original document.

3. The method of claim 1, wherein, at the process of in the step of (b), the access information is retrieved from the blockchain database.

4. The method of claim 1, wherein the header information includes transaction version information, transaction type information, and a time-stamp corresponding to a time of occurrence of the document-transmitting transaction.

5. The method of claim 1, wherein the transaction input includes at least one of (i) information on personnel with a document-viewing permission representing who has the document-viewing permission of the document, (ii) a previous document-transmitting transaction function value created by applying the specific operation to each previous document-transmitting transaction which is referred to by the document-transmitting transaction, (iii) an output index of said each previous document-transmitting transaction, and (iv) at least one signature value of at least one document transmitter who transmitted the document.

6. The method of claim 5, wherein the transaction input further includes document information, and wherein the document information includes an issuance time and date of the document, a type of the document, a title of the document, a document-information function value created by applying the specific operation to the information on the original document, information on the document issuance requester who requested the document, a unique identifier of the document, information on the document-issuing institution, information on a document-issuing person in charge of issuing the document, information on authenticity of the document, and the access information on the document.

7. The method of claim 6, wherein the information on the document issuance requester includes a name of the document issuance requester and an identifier of the document issuance requester, and wherein the identifier of the document issuance requester is a universally unique identifier (UUID).

8. The method of claim 5, wherein the transaction input further includes at least one piece of additional document information, and wherein the additional document information includes (i) a transaction ID representing information on a location of the document-transmitting transaction function value, created by applying the specific operation to the document-transmitting transaction, in the blockchain database, (ii) a content section, and (iii) a signature section.

9. The method of claim 8, wherein the content section includes a public key of an author of the additional document information, a time-stamp corresponding to a time of creation of the additional document information, and a comment added by the author of the additional document information, and wherein the signature section includes a signature value created by signing the content section with a private key of the author of the additional document information.

10. The method of claim 5, wherein the previous document-transmitting transaction function value included in the document-transmitting transaction corresponding to an issuance of the document is a null function value, and wherein the signature value of said at least one document transmitter is a signature value of the document-issuing institution, and wherein the signature value of said at least one document transmitter is included in the document-transmitting transaction.

11. The method of claim 1, wherein the redeeming condition-determining code is a smart contract, wherein the smart contract is (i) a source code which is compiled into bytecodes capable of an execution on at least one computing device, (ii) configured to perform management of the document according to whether the redeeming condition is satisfied, at a time of the execution, and wherein an integrity resulting from the execution is verified by a consensus outputted from the computing device.

12. The method of claim 1, wherein the document-transmitting and document-viewing conditions include at least one of (i) a condition for allowing the document to be viewed by at least one person, (ii) a condition for allowing transmission of the document to a third party, (iii) a condition for requiring a document-viewing person to log a fact that the document-viewing person viewed the document, (iv) a condition for requiring the document-viewing person to log a fact that the document-viewing person confirmed a content of the document, (v) a condition for restricting the document to be viewed by at least one predetermined specific entity only, (vi) a condition for restricting the document to be viewed by one or more entities belonging to a predetermined specific party only, (vii) a condition for preventing at least one predetermined certain entity from viewing the document, (viii) a condition for restricting the document to be viewed only if at least one predetermined particular entity allowed the document to be viewed, and (ix) a condition for restricting the number of the transmission of the document to be less than a predetermined number.

13. The method of claim 1, wherein the document restriction conditions include at least one of (i) a condition for preventing the information on the original document from being printed, and (ii) a condition for allowing transmission of the information on the original document via e-mails.

14. The method of claim 1, wherein the document fee-charging condition is for charging a fee on at least one of an issuance, a view, and a revocation of the document.

15. The method of claim 1, wherein the transaction output includes an address of at least one document recipient, a name of the document recipient, and an identifier of the document recipient.

16. A document-managing server for issuing a document based on a blockchain, comprising:
  a transceiver for acquiring a document-issuing request from a document issuance requester; and
  a processor configured to execute instructions to perform or support another device to perform processes of: (I) instructing a document-issuing server of a document-issuing institution which has an issuance permission of the document to acquire identification information on the document wherein a management permission of the document is given to the document-issuing institution, and instructing a document-storing device to acquire location information representing where the document is generated or stored by referring to the identification information on the document, to thereby acquire information on an original document including the document itself or its processed one which is generated or stored as corresponding to the location information and (II) (i) generating contents of a document-transmitting transaction representing a transfer of the management permission of the document from the document-issuing institution as a transmitter of the document to the document issuance requester as a recipient of the document, and transmitting the document-transmitting transaction to a blockchain database, to thereby instruct the blockchain database to store a document-transmitting transaction function value, created by applying a specific operation to the document-transmitting transaction, in the blockchain database itself, and (ii) displaying or supporting another device connected with the document-managing server to display access information, to be used for accessing an issuance result of the document and the information on the original document, to the document issuance requester,
  wherein the document-transmitting transaction includes header information, a transaction input, a transaction output, and at least one redeeming condition-determining code configured to determine at least one redeeming condition,
  wherein the redeeming condition is at least one of one or more document-transmitting and document-viewing conditions, one or more document restriction conditions, and a document fee-charging condition.

17. The document-managing server of claim 16, wherein the process of (II) further includes a process of:
  (iii) transmitting the information on the original document to the blockchain database or another database connected with the document-managing server, to thereby allow the blockchain database or said another database to retain the information on the original document.

18. The document-managing server of claim 16, wherein, at the process of (ii), the access information is retrieved from the blockchain database.

19. A method for issuing a document based on a blockchain, comprising steps of:
  (a) when a document-issuing request from a document issuance requester is acquired, instructing, by a document-managing server, a document-issuing server of a document-issuing institution which has an issuance permission of the document to acquire identification information on the document wherein a management permission of the document is given to the document-issuing institution; and instructing a document-storing device to acquire location information representing where the document is generated or stored by referring to the identification information on the document, to thereby acquire information on an original document including the document itself or information on a state of the processed document which is generated or stored as corresponding to the location information; and
  (b) (i) generating, by the document-managing server, contents of a document-transmitting transaction representing a transfer of the management permission of the document from the document-issuing institution as a transmitter of the document to the document issuance requester as a recipient of the document, and transmitting the document-transmitting transaction to a blockchain database, to thereby instruct the blockchain database to store a document-transmitting transaction function value, created by applying a specific operation to the document-transmitting transaction, in the blockchain database itself, and (ii) displaying, by the document-managing server, or supporting another device connected with the document-managing server to display, access information, to be used for accessing an issuance result of the document and the information on the original document, to the document issuance requester,
  wherein the document-transmitting transaction includes header information, a transaction input, a transaction output, and at least one redeeming condition-determining code configured to determine at least one redeeming condition,
  wherein the transaction input includes at least one of (i) information on personnel with a document-viewing permission representing who has the document-viewing permission of the document, (ii) a previous document-transmitting transaction function value created by applying the specific operation to each previous document-transmitting transaction which is referred to by the document-transmitting transaction, output index of said each previous document-transmitting transaction, and (iv) at least one signature value of at least one document transmitter who transmitted the document,
  wherein the transaction input further includes document information, and
  wherein the document information includes an issuance time and date of the document, a type of the document, a title of the document, a document-information function value created by applying the specific operation to the information on the original document, information on the document issuance requester who requested the document, a unique identifier of the document, information on the document-issuing institution, information on a document-issuing person in charge of issuing the document, information on authenticity of the document, and the access information on the document.

20. A method for issuing a document based on a blockchain, comprising steps of:
  when a document-issuing request from a document issuance requester is acquired, instructing, by a document-managing server, a document-issuing server of a document-issuing institution which has an issuance permission of the document to acquire identification information on the document wherein a management permission of the document is given to the document-issuing institution, and instructing a document-storing device to acquire location information representing where the document is generated or stored by referring to the identification information on the document, to thereby acquire information on an original document including the document itself or information on a state of the processed document which is generated or stored as corresponding to the location information; and (b) (i) generating, by the document-managing server, contents of a document-transmitting transaction representing a transfer of the management permission of the document from the document-issuing institution as a transmitter of the document to the document issuance requester as a recipient of the document, and transmitting the document-transmitting transaction to a blockchain database, to thereby instruct the blockchain database to store a document-transmitting transaction function value, created by applying a specific operation to the document-transmitting transaction, in the blockchain database itself, and (ii) displaying, by the document-managing server, or supporting another device connected with the document-managing server to display, access information, to be used for accessing an issuance result of the document and the information on the original document, to the document issuance requester, wherein the document-transmitting transaction includes header information, a transaction input, a transaction output, and at least one redeeming condition-determining code configured to determine at least one redeeming condition, wherein the transaction input includes at least one of (i) information on personnel with a document-viewing permission representing who has the document-viewing permission of the document, (ii) a previous document-transmitting transaction function value created by applying the specific operation to each previous document-transmitting transaction which is referred to by the document-transmitting transaction, (iii) an output index of said each previous document-transmitting transaction, and (iv) at least one signature value of at least one document transmitter who transmitted the document, wherein the transaction input further includes at least one piece of additional document information, and wherein the additional document information includes (i) a transaction ID representing information on a location of the document-transmitting transaction function value, created by applying the specific operation to the document-transmitting transaction, in the blockchain database, (ii) a content section, and (iii) a signature section.

21. A method for issuing a document based on a blockchain, comprising steps of:

(a) when a document-issuing request from a document issuance requester is acquired, instructing, by a document-managing server, a document-issuing server of a document-issuing institution which has an issuance permission of the document to acquire identification information on the document wherein a management permission of the document is given to the document-issuing institution, and instructing a document-storing device to acquire location information representing where the document is generated or stored by referring to the identification information on the document, to thereby acquire information on an original document including the document itself or information on a state of the processed document which is generated or stored as corresponding to the location information; and (b) (i) generating, by the document-managing server, contents of a document-transmitting transaction representing a transfer of the management permission of the document from the document-issuing institution as a transmitter of the document to the document issuance requester as a recipient of the document, and transmitting the document-transmitting transaction to a blockchain database, to thereby instruct the blockchain database to store a document-transmitting transaction function value, created by applying a specific operation to the document-transmitting transaction, in the blockchain database itself, and (ii) displaying, by the document-managing server, or supporting another device connected with the document-managing server to display, access information, to be used for accessing an issuance result of the document and the information on the original document, to the document issuance requester, wherein the document-transmitting transaction includes header information, a transaction input, a transaction output, and at least one redeeming condition-determining code configured to determine at least one redeeming condition, wherein the transaction input includes at least one of information on personnel with a document-viewing permission representing who has the document-viewing permission of the document, (ii) a previous document-transmitting transaction function value created by applying the specific operation to each previous document-transmitting transaction which is referred to by the document-transmitting transaction, (iii) an output index of said each previous document-transmitting transaction, and (iv) at least one signature value of at least one document transmitter who transmitted the document, wherein the previous document-transmitting transaction function Value included in the document-transmitting transaction corresponding to an issuance of the document is a null function value, and wherein the signature value of said at least one document transmitter is a signature value of the document-issuing institution, and wherein the signature value of said at least one document transmitter is included in the document-transmitting transaction.

22. A document-managing server for issuing a document based on a blockchain, comprising:

a transceiver for acquiring a document-issuing request from a document issuance request; and a processor configured to execute instructions to perform or support another device to perform processes of: (I) instructing a document-issuing server of a document-issuing institution which has an issuance permission of the document to acquire identification information on the document wherein a management permission of the document is given to the document-issuing institution, and instructing a document-storing device to acquire location information representing where the document is generated or stored by referring to the identification information on e document, to thereby acquire information on an original document including the document itself or its processed one which is generated or stored as corresponding to the location information and (II) (i) generating contents of a document-transmitting transaction representing a transfer of the management permission of the document from front the document-issuing institution as a transmitter of the document to the document issuance requester as a recipient of the document, and transmitting the document-transmitting transaction to a blockchain database, to thereby instruct the blockchain database to store a document-transmitting transaction function value, created by applying a specific operation to the document-transmitting transaction, in the blockchain database itself, and (ii) displaying or supporting another device connected with the document-managing server to display access information, to be used for accessing an issuance result of the document and the information on the original document, to the document issuance requester, wherein the document-transmitting transaction includes header information, a transaction input, a transaction output, and at least one redeeming condition-determining code configured to determine at least one redeeming condition, wherein the transaction input includes at least one of (i) information on personnel with a document-viewing permission representing who has the document-viewing permission of the document, (ii) a previous document-transmitting transaction function value created by applying the specific operation to each previous document-transmitting transaction which is referred to by the document-transmitting transaction, (iii) an output index of said each previous document-transmitting transaction, and (iv) at least one signature value of at least one document transmitter who transmitted the document, wherein the transaction input further includes document information, and wherein the document information includes an issuance time and date of the document, a type of the document, a title of the document, a document-information function value created by applying the specific operation to the information on the original document, information on the document issuance requester who requested the document, a unique identifier of the document, information on the document-issuing institution, information on a document-issuing person in charge of issuing the document, information on authenticity of the document, and the access information on the document.

23. A document-managing server for issuing a document based on a blockchain, comprising:

a transceiver for acquiring a document-issuing request from a document issuance requester; and a processor configured to execute instructions to perform or support another device to perform processes of: (I) instructing a document-issuing server of a document-issuing institution which has an issuance permission of the document to acquire identification information on the document wherein a management permission of the document is given to the document-issuing institution; and instructing a document-storing device to acquire location information representing where the document is generated or stored by referring to the identification information on the document, to thereby acquire information on an original document including the document itself or its processed one which is generated or stored as corresponding to the location information and (II) (i) generating contents of a document-transmitting transaction representing a transfer of the management permission of the document from the document-issuing institution as a transmitter of the document to the document issuance requester as a recipient of the document, and transmitting the document-transmitting transaction to a blockchain database, to thereby instruct the blockchain database to store a document-transmitting transaction function value, created by applying a specific operation to the document-transmitting transaction, in the blockchain database itself, and (ii) displaying or supporting another device connected with the document-managing server to display access information, to be used for accessing an issuance result of the document and the information on the original document, to the document issuance requester, wherein the document-transmitting transaction includes header information, a transaction input, a transaction output, and at least one redeeming condition-determining code configured to determine at least one redeeming condition, wherein the transaction input includes at least one of (i) information on personnel with a document-viewing permission representing who has the document-viewing permission of the document, (ii) a previous document-transmitting transaction function value created by applying the specific operation to each previous document-transmitting transaction which is referred to by the document-transmitting transaction, (iii) an output index of said each previous document-transmitting transaction, and (iv) at least one signature value of at least one document transmitter who transmitted the document, wherein the transaction input further includes at least one piece of additional document information, and wherein the additional document information includes a transaction ID representing information on a location of the document-transmitting transaction function value, created by applying the specific operation to the document-transmitting transaction, in the blockchain database, (ii) a content section, and (iii) a signature section.

24. A document-managing server for issuing a document based on a blockchain, comprising:

a transceiver for acquiring a document-issuing request from a document issuance requester; and a processor configured to execute instructions to perform or support another device to perform processes of: (I) instructing a document-issuing server of a document-issuing institution which has an issuance permission of the document to acquire identification information on the document wherein a management permission of the document is given to the document-issuing institution, and instructing a document-storing device to acquire location information representing where the document is generated or stored by referring to the identification information on the document, to thereby acquire information on an original document including the document itself or its processed one which is generated or stored as corresponding to the location information and (II) (i) generating contents of a document-transmitting transaction representing a transfer of the management permission of the document from the document-issuing institution as a transmitter of the document to the document issuance requester as a recipient of the document, and transmitting the document-transmitting transaction to a blockchain database, to thereby instruct the blockchain database to store a document-transmitting transaction function value, created by applying a specific operation to the document-transmitting transaction, in the blockchain database itself, and (ii) displaying or supporting another device connected with the document-managing server to display access information, to be used for accessing an issuance result of the document and the information on the original document, to the document issuance requester, wherein the document-transmitting transaction includes header information, a transaction input, a transaction output, and at least one redeeming condition-determining code configured to determine at least one redeeming condition, wherein the transaction input includes at least one of (i) information on personnel with a document-viewing permission representing who has the document-viewing permission of the document, (ii) a previous document-transmitting transaction function value created by applying the specific operation to each previous document-transmitting transaction which is referred to by the document-transmitting transaction, (iii) an output index of said each previous document-transmitting transaction, and (iv) at least one signature value of at least one document transmitter who transmitted the document, wherein the previous document-transmitting transaction function value included in the document-transmitting transaction corresponding to an issuance of the document is a null function value, and wherein the signature value of said at least one document transmitter is a signature value of the document-issuing institution, and wherein the signature value of said at least one document transmitter is included in the document-transmitting transaction.

* * * * *